(12) United States Patent
Muchow

(10) Patent No.: US 7,587,465 B1
(45) Date of Patent: Sep. 8, 2009

(54) METHOD AND APPARATUS FOR CONFIGURING NODES AS MASTERS OR SLAVES

(75) Inventor: James D. Muchow, Zimmerman, MN (US)

(73) Assignee: Cisco Technology, Inc., San Jose, CA (US)

( * ) Notice: Subject to any disclaimer, the term of this patent is extended or adjusted under 35 U.S.C. 154(b) by 623 days.

(21) Appl. No.: 10/131,275

(22) Filed: Apr. 22, 2002

(51) Int. Cl.
G06F 15/16 (2006.01)
G06F 15/173 (2006.01)
G06F 11/00 (2006.01)
G06F 13/00 (2006.01)

(52) U.S. Cl. .......................... 709/209; 709/208; 714/4

(58) Field of Classification Search .................. 709/201, 709/204, 205, 208, 209, 223, 226; 700/3; 710/110; 714/4
See application file for complete search history.

(56) References Cited

U.S. PATENT DOCUMENTS

| | | | |
|---|---|---|---|
| 4,495,617 A | | 1/1985 | Ampulski et al. |
| 5,390,326 A | | 2/1995 | Shah |
| 5,461,608 A | * | 10/1995 | Yoshiyama ................. 370/222 |
| 5,473,599 A | | 12/1995 | Li et al. |
| 5,491,812 A | | 2/1996 | Pisello et al. |
| 5,535,395 A | * | 7/1996 | Tipley et al. ................ 710/241 |
| 5,544,077 A | * | 8/1996 | Hershey ...................... 702/58 |
| 5,579,491 A | | 11/1996 | Jeffries et al. |
| 5,600,828 A | | 2/1997 | Johnson et al. |
| 5,642,337 A | | 6/1997 | Oskay et al. |
| 5,666,486 A | * | 9/1997 | Alfieri et al. ................. 709/217 |
| 5,732,206 A | * | 3/1998 | Mendel ......................... 714/4 |
| 5,812,821 A | | 9/1998 | Sugi et al. |
| 5,832,299 A | | 11/1998 | Wooten |
| 5,850,573 A | | 12/1998 | Wada |
| 5,870,571 A | | 2/1999 | Duburcq et al. |
| 5,909,544 A | | 6/1999 | Anderson et al. |
| 5,935,215 A | | 8/1999 | Bell et al. |
| 5,951,683 A | * | 9/1999 | Yuuki et al. ................... 713/1 |

(Continued)

OTHER PUBLICATIONS

Gusella, R., et al., "An Election Algorithm for a Distributed Clock Synchronization Program", *CS Technical Report #275*, University of California, Berkeley,(Dec. 1985),pp. 1-14.

(Continued)

*Primary Examiner*—Liangche A Wang
*Assistant Examiner*—Philip J Chea
(74) *Attorney, Agent, or Firm*—Schwegman, Lundberg & Woessner, P.A.

(57) ABSTRACT

A node (101, FIG. 1), within a networked computer system (100), is capable of supporting communications with other nodes relating to operating multiple application instances in a master-slave configuration. A node can be designated as a permanent master for an application instance, meaning that the node will enter the master state (218, FIG. 2) for the application instance whether or not another master exists on the network. A node also can be designated as a preferred slave. A preferred slave initializes (306, FIG. 3) its election timer that is below the election timers selected by other slaves, which causes the preferred slave to call an election before any other slave, and increases the likelihood that the preferred slave will become master if a failover occurs. In addition, a master can specifically resign (510, FIG. 5) to a preferred slave.

28 Claims, 11 Drawing Sheets

U.S. PATENT DOCUMENTS

| | | | |
|---|---|---|---|
| 5,991,813 A | 11/1999 | Zarrow | |
| 5,996,024 A | 11/1999 | Blumenau | |
| 5,996,027 A | 11/1999 | Volk et al. | |
| 6,006,259 A * | 12/1999 | Adelman et al. | 709/223 |
| 6,009,476 A | 12/1999 | Flory et al. | |
| 6,009,480 A | 12/1999 | Pleso | |
| 6,018,765 A | 1/2000 | Durana et al. | |
| 6,041,381 A | 3/2000 | Hoese | |
| 6,078,957 A * | 6/2000 | Adelman et al. | 709/224 |
| 6,108,300 A | 8/2000 | Coile et al. | |
| 6,108,699 A | 8/2000 | Moiin | |
| 6,131,119 A | 10/2000 | Fukui | |
| 6,134,673 A | 10/2000 | Chrabaszcz | |
| 6,145,019 A | 11/2000 | Firooz et al. | |
| 6,151,297 A | 11/2000 | Congdon et al. | |
| 6,163,855 A | 12/2000 | Shrivastava et al. | |
| 6,178,445 B1 * | 1/2001 | Dawkins et al. | 709/209 |
| 6,185,620 B1 | 2/2001 | Weber et al. | |
| 6,195,687 B1 | 2/2001 | Greaves et al. | |
| 6,195,760 B1 | 2/2001 | Chung et al. | |
| 6,209,023 B1 | 3/2001 | Dimitroff et al. | |
| 6,219,771 B1 | 4/2001 | Kikuchi et al. | |
| 6,268,924 B1 | 7/2001 | Koppolu et al. | |
| 6,269,396 B1 | 7/2001 | Shah et al. | |
| 6,314,526 B1 | 11/2001 | Arendt et al. | |
| 6,327,622 B1 | 12/2001 | Jindal et al. | |
| 6,343,320 B1 * | 1/2002 | Fairchild et al. | 709/224 |
| 6,353,612 B1 | 3/2002 | Zhu et al. | |
| 6,363,416 B1 * | 3/2002 | Naeimi et al. | 709/209 |
| 6,378,025 B1 | 4/2002 | Getty | |
| 6,392,990 B1 | 5/2002 | Tosey et al. | |
| 6,393,583 B1 | 5/2002 | Meth et al. | |
| 6,400,730 B1 | 6/2002 | Latif et al. | |
| 6,449,652 B1 | 9/2002 | Blumenau et al. | |
| 6,470,382 B1 | 10/2002 | Wang et al. | |
| 6,470,397 B1 | 10/2002 | Shah et al. | |
| 6,473,803 B1 | 10/2002 | Stern et al. | |
| 6,480,901 B1 | 11/2002 | Weber et al. | |
| 6,484,245 B1 | 11/2002 | Sanada et al. | |
| 6,560,630 B1 | 5/2003 | Vepa et al. | |
| 6,574,755 B1 | 6/2003 | Seon | |
| 6,591,310 B1 | 7/2003 | Johnson | |
| 6,597,956 B1 * | 7/2003 | Aziz et al. | 700/3 |
| 6,640,278 B1 | 10/2003 | Nolan et al. | |
| 6,654,830 B1 | 11/2003 | Taylor et al. | |
| 6,658,459 B1 | 12/2003 | Kwan et al. | |
| 6,665,702 B1 | 12/2003 | Zisapel et al. | |
| 6,678,721 B1 * | 1/2004 | Bell | 709/209 |
| 6,683,883 B1 | 1/2004 | Czeiger et al. | |
| 6,691,244 B1 * | 2/2004 | Kampe et al. | 714/4 |
| 6,697,924 B2 | 2/2004 | Swank | |
| 6,701,449 B1 | 3/2004 | Davis et al. | |
| 6,718,361 B1 | 4/2004 | Basani et al. | |
| 6,718,383 B1 | 4/2004 | Hebert | |
| 6,721,907 B2 | 4/2004 | Earl | |
| 6,724,757 B1 | 4/2004 | Zadikian et al. | |
| 6,728,780 B1 | 4/2004 | Hebert | |
| 6,748,550 B2 | 6/2004 | McBrearty et al. | |
| 6,757,291 B1 | 6/2004 | Hu | |
| 6,760,783 B1 | 7/2004 | Berry | |
| 6,763,195 B1 | 7/2004 | Willebrand et al. | |
| 6,763,419 B2 | 7/2004 | Hoese et al. | |
| 6,766,520 B1 | 7/2004 | Rieschl et al. | |
| 6,771,663 B1 | 8/2004 | Jha | |
| 6,771,673 B1 | 8/2004 | Baum et al. | |
| 6,799,316 B1 | 9/2004 | Aguilar et al. | |
| 6,807,581 B1 | 10/2004 | Starr et al. | |
| 6,823,418 B2 | 11/2004 | Langendorf et al. | |
| 6,839,752 B1 | 1/2005 | Miller et al. | |
| 6,845,403 B2 | 1/2005 | Chadalapaka | |
| 6,856,591 B1 | 2/2005 | Ma et al. | |
| 6,859,462 B1 | 2/2005 | Mahoney et al. | |
| 6,874,147 B1 | 3/2005 | Diamant | |
| 6,877,044 B2 | 4/2005 | Lo et al. | |
| 6,885,633 B1 | 4/2005 | Mikkonen | |
| 6,886,171 B2 | 4/2005 | MacLeod | |
| 6,889,338 B2 * | 5/2005 | Srinivasan et al. | 714/4 |
| 6,895,461 B1 | 5/2005 | Thompson | |
| 6,920,491 B2 | 7/2005 | Kim | |
| 6,922,743 B2 | 7/2005 | Mizuno | |
| 6,934,799 B2 | 8/2005 | Acharya et al. | |
| 6,938,092 B2 | 8/2005 | Burns | |
| 6,944,785 B2 | 9/2005 | Gadir et al. | |
| 6,954,436 B1 * | 10/2005 | Yip et al. | 370/254 |
| 6,965,934 B1 | 11/2005 | Reynolds et al. | |
| 7,043,727 B2 | 5/2006 | Bennett et al. | |
| 7,165,258 B1 | 1/2007 | Kuik et al. | |
| 7,188,194 B1 | 3/2007 | Kuik et al. | |
| 7,200,610 B1 | 4/2007 | Prawdiuk et al. | |
| 7,240,098 B1 | 7/2007 | Mansee | |
| 7,281,062 B1 | 10/2007 | Kuik et al. | |
| 7,353,259 B1 | 4/2008 | Bakke et al. | |
| 2002/0010750 A1 | 1/2002 | Baretzki | |
| 2002/0023150 A1 | 2/2002 | Osafune et al. | |
| 2002/0042693 A1 | 4/2002 | Kampe et al. | |
| 2002/0049845 A1 | 4/2002 | Sreenivasan et al. | |
| 2002/0055978 A1 * | 5/2002 | Joon-Bo et al. | 709/209 |
| 2002/0059392 A1 | 5/2002 | Ellis | |
| 2002/0065872 A1 | 5/2002 | Genske et al. | |
| 2002/0103943 A1 | 8/2002 | Lo et al. | |
| 2002/0108106 A1 * | 8/2002 | Kramskoy et al. | 717/148 |
| 2002/0116460 A1 | 8/2002 | Treister et al. | |
| 2002/0126680 A1 | 9/2002 | Inagaki et al. | |
| 2002/0156612 A1 | 10/2002 | Schulter et al. | |
| 2002/0178143 A1 | 11/2002 | Fujimoto | |
| 2002/0188657 A1 | 12/2002 | Traversat et al. | |
| 2002/0188711 A1 | 12/2002 | Meyer et al. | |
| 2002/0194428 A1 | 12/2002 | Green | |
| 2003/0005068 A1 * | 1/2003 | Nickel et al. | 709/208 |
| 2003/0014462 A1 | 1/2003 | Bennett et al. | |
| 2003/0018813 A1 | 1/2003 | Antes et al. | |
| 2003/0018927 A1 | 1/2003 | Gadir et al. | |
| 2003/0037284 A1 * | 2/2003 | Srinivasan et al. | 714/11 |
| 2003/0058870 A1 | 3/2003 | Mizrachi et al. | |
| 2003/0084209 A1 | 5/2003 | Chadalapaka | |
| 2003/0097607 A1 | 5/2003 | Bessire | |
| 2003/0115447 A1 | 6/2003 | Pham et al. | |
| 2003/0140193 A1 | 7/2003 | Acharya et al. | |
| 2003/0145108 A1 | 7/2003 | Joseph et al. | |
| 2003/0149830 A1 | 8/2003 | Torr et al. | |
| 2003/0182455 A1 | 9/2003 | Hetzler et al. | |
| 2003/0208579 A1 | 11/2003 | Brady et al. | |
| 2003/0210686 A1 | 11/2003 | Terrell et al. | |
| 2004/0024778 A1 | 2/2004 | Cheo | |
| 2004/0064553 A1 | 4/2004 | Kjellberg | |
| 2004/0141468 A1 | 7/2004 | Christensen | |
| 2004/0233910 A1 | 11/2004 | Chen et al. | |
| 2005/0055418 A1 | 3/2005 | Blanc et al. | |
| 2005/0063313 A1 | 3/2005 | Nanavati et al. | |
| 2005/0268151 A1 * | 12/2005 | Hunt et al. | 714/4 |
| 2006/0265529 A1 | 11/2006 | Kuik et al. | |
| 2007/0112931 A1 | 5/2007 | Kuik et al. | |

OTHER PUBLICATIONS

Gusella, R., et al., "The Berkeley UNIX Time Synchronization Protocol", *UNIX Programmers Manual, 4.3 Berkeley Software Distrib.*, vol. 2C, (1986), 10 pages.

Lewis, P., "A High-Availability Cluster for Linux", http://www2.linuxjournal.com/lj-issues/issue64/3247.html,(Apr. 1994), 11 pages.

*VMware ESX Server: User's Manual*, Version 1.0, obtained from http://web.archive.org/web/20010608201203/www.vmware.com/support,(Jun. 6, 2001), 122-124.

Bakker, G., *IP Aliasing*, obtained from http://www.zone-h.org/files/24/ip_aliasing.txt,(1999),3 p.

Knight, S., et al., *Virtual Router Redundancy Protocol*, Network Working Group, RFC 2338, obtained from http://www.search.ietf.org/rfc/rfc2338.txt,(1998),26 p.

Li, T., et al., *CIsco Hot Standby Router Protocol (HSRP)*, Network Working Group, RFC 2281, obtained from http://www.search.ietf.org/rfc/rfc2281.txt,(1998), 16 p.

Meth, K. Z., et al., "Design of the iSCSI protocol", *Proceedings of the 20th IEEE Conference on Mass Storage Systems and Technologies*, (Apr. 7-10, 2003), 116-122.

Moore, K., *On the Use of HTTP as a Substrate*, Network Working Group, RFC 3205, obrtained from http://www.search.ietf.org/rfc/rfc3205.txt,(2002), 14 p.

Satran, J., et al., *iSCSI*, IPS Internet Draft, draft-ietf-ips-iSCSI-12.txt, Category: standards—track,(Apr. 17, 2002),260 p.

Satran, J., et al., *iSCSI*, IPS Internet Draft, draft-ietf-ips-iSCSI-00, Category: Standards Track, obtained from http://www.haifa.il.ilb.com/satran/ips/draft-ietf-ips-iSCSI-00.txt,(Nov. 2000),78 p.

Simitci, H., et al., "Evaluation of SCSP over TCP/IP and SCSI over fibre channel connections", *Hot Interconnects, 9, IEEE 2001*, (Aug. 2001),87-91.

"U.S. Appl. No. 10/094,552, Response filed Apr. 21, 2006 to Non Final Office Action mailed Nov. 21, 2005", 6 pgs.

"U.S. Appl. No. 10/094,552, Response filed Oct. 12, 2006 to Final Office Action mailed Jul. 12, 2006", 14 pgs.

"U.S. Appl. No. 10/094,552 Amendment and Response filed Aug. 4, 2005 to Office Action mailed May 4, 2005", 14 pgs.

"U.S. Appl. No. 10/094,552 Final Office Action mailed Jul. 12, 2006", 20 pgs.

"U.S. Appl. No. 10/094,552 Non Final Office Action mailed May 4, 2005", 16 pgs.

"U.S. Appl. No. 10/094,552 Non Final Office Action mailed Nov. 21, 2005", 18 pgs.

"U.S. Appl. No. 10/094,552 Notice of Allowance mailed Jan. 31, 2007", 12 pgs.

"U.S. Appl. No. 10/094,552 Notice of Allowance mailed Sep. 13, 2007", 7 p.

"U.S. Appl. No. 10/122,401 Non Final Office Action mailed Jun. 14, 2006", 34 pgs.

"U.S. Appl. No. 10/122,401 Non Final Office Action mailed Aug. 17, 2004", 31 pgs.

"U.S. Appl. No. 10/122,401 Notice of Allowance mailed Apr. 2, 2007", 6 pgs.

"U.S. Appl. No. 10/122,401, Amendment and Response filed Aug. 29, 2005 to Final Office Action mailed Jun. 28, 2005", 20 pgs.

"U.S. Appl. No. 10/122,401, Amendment and Response filed Oct. 13, 2006 to Office Action mailed Jun. 14, 2006", 22 pgs.

"U.S. Appl. No. 10/122,401, Amendment and Response filed Mar. 6, 2006 to Office Action mailed Oct. 6, 2005", 21 pgs.

"U.S. Appl. No. 10/122,401, Amendment and Response mailed Nov. 17, 2004 to Office Action mailed Aug. 17, 2004", 23 pgs.

"U.S. Appl. No. 10/122,401, Final Office Action mailed Jun. 28, 2005", 33 pgs.

"U.S. Appl. No. 10/122,401, Non-Final Office Action mailed Oct. 6, 2005", 34 pgs.

"U.S. Appl. No. 10/122,401, Notice of Allowance mailed Aug. 22, 2007", 6 p.

"U.S. Appl. No. 10/122,401 Response filed Feb. 28, 2007 to Examiner Communication mailed Jan. 29, 2007", 13 p.

"U.S. Appl. No. 10/128,657, Amendment and Response filed Jan. 8, 2007 to Office Action mailed Aug. 8, 2006", 14 pgs.

"U.S. Appl. No. 10/128,657, Amendment and Response filed May 19, 2006 to Office Action mailed Dec. 19, 2005", 13 pgs.

"U.S. Appl. No. 10/128,657, Amendment and Response filed Sep. 16, 2005 to Office Action mailed May 16, 2005", 15 pgs.

"U.S. Appl. No. 10/128,657, Final Office Action mailed Aug. 8, 2006", 16 pgs.

"U.S. Appl. No. 10/128,657, Non-Final Office Action mailed Dec. 19, 2005", 19 pgs.

"U.S. Appl. No. 10/128,657, Non-Final Office Action mailed Apr. 4, 2007", 16 pgs.

"U.S. Appl. No. 10/128,657, Non-Final Office Action mailed May 16, 2005", 25 pgs.

"U.S. Appl. No. 10/128,657, Response filed Aug. 6, 2007 to Office Action mailed Apr. 4, 2007", 13 p.

"U.S. Appl. No. 10/128,657, Supplemental Amendment filed Oct. 4, 2007", 12 p.

"U.S. Appl. No. 10/131,274, Amendment and Response mailed Oct. 3, 2005", 17 pgs.

"U.S. Appl. No. 10/131,274, Advisory Action mailed Mar. 30, 2006", 6 pgs.

"U.S. Appl. No. 10/131,274, Amendment and Response filed Mar. 6, 2006 to Final Office Action mailed Dec. 6, 2005", 12 pgs.

"U.S. Appl. No. 10/131,274, Amendment and Response filed Mar. 6, 2007 to Office Action mailed Oct. 6, 2006", 14 pgs.

"U.S. Appl. No. 10/131,274, Amendment and Response filed Jul. 6, 2006 to Final Office Action mailed Dec. 6, 2005", 19 pgs.

"U.S. Appl. No. 10/131,274, Final Office Action mailed Dec. 6, 2005", 13 pgs.

"U.S. Appl. No. 10/131,274, Final Office Action mailed May 18, 2007", 14 pgs.

"U.S. Appl. No. 10/131,274, Non-Final Office Action mailed Oct. 6, 2006 in", 11 pgs.

"U.S. Appl. No. 10/131,274, Non-Final Office Action mailed Jun. 1, 2005", 11 pgs.

"U.S. Appl. No. 10/131,274, Notice of Panel Decision from Pre-Appeal Brief Review mailed Apr. 25, 2006", 2 pgs.

"U.S. Appl. No. 10/131,274, Pre-Appeal Brief Request for Review mailed Apr. 6, 2006", 10 pgs.

"U.S. Appl. No. 10/131,274, Response filed Aug. 20, 2007 to Final Office Action mailed May 18, 2007", 12 p.

"U.S. Appl. No. 10/131,274, Non-Final Office Action mailed Sep. 27, 2007", 11 p.

"U.S. Appl. No. 11/748,966, Supplemental Preliminary Amendment filed Jul. 3, 2007", 12 p.

"U.S. Appl. No. 10/128,657, Notice of Allowance mailed Nov. 2, 2007", NOAR,2 pgs.

US 7,231,429, 06/2007, Muchow (withdrawn)

* cited by examiner

| | APPLICATION TYPE ⟋502 | APPLICATION ID ⟋504 | CURRENT STATE ⟋506 | STATE TIMER VALUE ⟋508 | MONITOR RESULT FLAG ⟋510 |
|---|---|---|---|---|---|
| 520 | 433 | 1037 | MASTER | 2 | 0 |
| 521 | 433 | 1234 | SLAVE | 2 | 0 |
| 522 | 433 | 4578 | CANDIDATE | 6 | 0 |
| 524 | 856 | 3296 | MASTER | 2 | 1 |
| 525 | 763 | 1037 | RESIGNATION | 0 | 0 |
| 526 | 763 | 9876 | MASTER | 2 | 0 |
| 528 | - | - | NULL | 5 | 0 |

METHOD AND APPARATUS FOR CONFIGURING NODES AS MASTERS OR SLAVES

RELATED APPLICATIONS

This invention is related to application Ser. No. 10/122,401, filed Apr. 11, 2002, entitled "METHOD AND APPARATUS FOR SUPPORTING COMMUNICATIONS BETWEEN NODES OPERATING IN A MASTER-SLAVE CONFIGURATION" which is a continuation of application Ser. No. 09/949,182, filed Sep. 7, 2001, entitled "METHOD AND APPARATUS FOR SUPPORTING COMMUNICATIONS BETWEEN NODES OPERATING IN A MASTER-SLAVE CONFIGURATION", application Ser. No. 10/094,552, filed Mar. 7, 2002, entitled "METHOD AND APPARATUS FOR EXCHANGING HEARTBEAT MESSAGES AND CONFIGURATION INFORMATION BETWEEN NODES OPERATING IN A MASTER-SLAVE CONFIGURATION" and application Ser. No. 10/131,274, filed even date herewith, entitled "METHOD AND APPARATUS FOR TERMINATING APPLICATIONS IN A HIGH AVAILABILITY NETWORK" all of the above of which are hereby incorporated by reference.

TECHNICAL FIELD OF THE INVENTION

The present invention relates generally to methods for managing execution of multiple applications within a networked, multi-processor system, and more specifically, methods for configuring an application instance within a node as a master or a slave.

BACKGROUND OF THE INVENTION

In some computer systems, it is important to maximize the availability of critical services and applications. Generally, this is achieved by using a fault tolerant system or by using high availability ("HA") software, which is implemented on a cluster of multiple nodes. Both types of systems are described briefly in "A High-Availability Cluster for Linux," Phil Lewis (May 2, 2000).

A fault tolerant computer system includes duplicate hardware and software. For example, a fault tolerant server may have redundant power supplies, storage devices, fans, network interface cards, and so on. When one or more of these components fails, the fault is detected, and a redundant component takes over to correct the problem. In many cases, fault tolerant systems are able to provide failure recovery, which is nearly seamless (i.e., unperceivable to system users). However, because these systems rely on duplicate hardware, they tend to be expensive. In addition, these systems typically are proprietary, and are tightly coupled to the operating system, whatever that system may be.

HA software also provides fault detection and correction procedures. Generally, an HA software implementation is loosely coupled to the operating system, and therefore may be more portable to different types of systems and nodes than a fault tolerant system would be.

In contrast to fault tolerant systems, HA software is implemented on two or more nodes, which are arranged in a "cluster" and communicate over a link (e.g., a network). Typically, one node operates as the "master" for a particular application, where the master is responsible for executing the application. One or more other nodes within the cluster are "slaves" for that application, where each slave is available to take over the application from a failed master, if necessary.

The "Time Synchronization Protocol" (TSP) is an example of such an HA protocol, which is used by the clock synchronization programs timed and TEMPO. TSP is described in detail in "The Berkeley UNIX Time Synchronization Protocol," Gusella, et al. (1986). TSP supports messages for the election that occurs among slaves when, for any reason, the master disappears, as is described in detail in "An Election Algorithm for a Distributed Clock Synchronization Program," Gusella et al. (December 1985).

Often, applications are defined on certain nodes for a reason. For example, in a simple routing application, each node in a cluster may have preferred routes to various network segments, even though a node can get to any segment using less desirable, alternate routes. Each node is a master for a single routing application and is a slave for other nodes' routing applications. Accordingly, if a first node or it's routing application is down (e.g., the node or the application failed), a second node can take over and become master of the first node's routing application. While the first node or its routing application is down, the data streams that would otherwise have passed through the node are sent using a different route, which may be less optimal. When the first node and/or it's routing application comes back up, it is desirable to have the first node's routing application re-acquire it's status as master as quickly as possible, in order to restore the optimal route.

Similarly, it may be desirable for a master to fail over to a specific slave, rather than allowing a slave arbitrarily to be promoted to master through the election process. For example, using the routing example given above, when a first node is being taken down, it may be advantageous to resign the node's routing application to a second node that can still provide efficient routing for network traffic.

One disadvantage to current HA systems is that, once a node has relinquished its status as master for an application instance (e.g., through a node failure or resignation), the original master cannot later recover its status as master without difficulty. Another disadvantage is that current HA systems provide no way of failing over or resigning to a particular slave.

Accordingly, what are needed are a protocol, apparatus, and method that enable a node to efficiently take over as master. Further needed are a protocol, apparatus, and method that enable a master to fail over or resign to a particular slave, when desired.

BRIEF DESCRIPTION OF THE DRAWING

FIG. 5 is an example of an application instance state table in accordance with one embodiment of the present invention;

DETAILED DESCRIPTION OF THE INVENTION

Various embodiments of the present invention provide methods for operating a node, within a networked computer system, which is capable of supporting communications with other nodes relating to operating multiple application instances in a master-slave configuration. The node maintains a state diagram for each application instance currently running in the master-slave configuration on the node and on the other nodes. In addition, the node listens for new application instances that are discovered on the node and on the other nodes. The nodes can be interconnected using multiple networks.

In one embodiment, a node can be configured as a "permanent master" for an application instance, meaning that the node automatically becomes the master for the application instance when it is started or re-started, and eliminates any other master that might exist. Basically, the permanent master will force any other node that is currently a master of an application instance to quit.

When a node determines that it should no longer operate as a master for an application instance, the node can initiate a resignation process, during which another node will attempt to become the master for the application instance. In one embodiment, the node attempts to resign to a first "preferred slave." If the first preferred slave is unable to take over, the node can attempt to resign, sequentially, to one or more other preferred slaves.

Each node occasionally sends out a "Heartbeat" message, which informs other nodes that it is a master (and/or a slave) for one or more application instances. The Heartbeat message indicates the status of each master and/or slave that the node is operating or maintaining. In one embodiment, the first preferred slave is the slave from whom the master most recently received a Heartbeat message.

Figure 1:
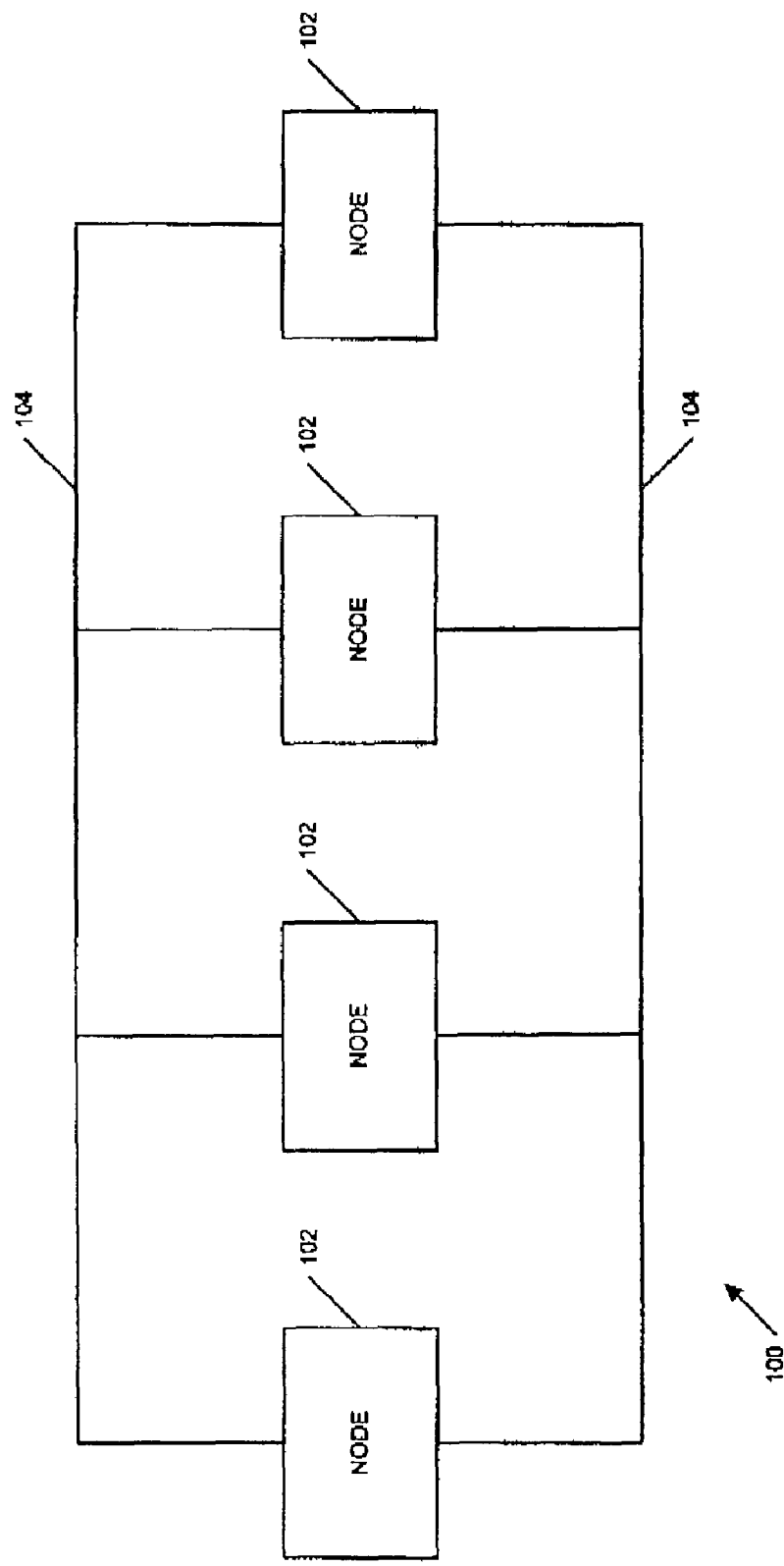
FIG. 1 illustrates a typical computer system within which the various embodiments of the present invention can be practiced.

FIG. 1 illustrates a typical computer system 100 within which the various embodiments of the present invention can be practiced. System 100 includes multiple nodes 102 interconnected by one or more communication networks 104. A "node," as used herein, refers to a distinct processing element of a computer system, which could be co-located with or remote from other nodes of the computer system. For example, some or all of the multiple nodes 102 could be stand-alone computers within a networked computer system. Alternatively, some or all of the multiple nodes 102 could be processors that are co-located within a single computer or facility, and which are networked together.

Although FIG. 1 illustrates four nodes 102 and two networks 104, a system could include more or fewer nodes interconnected by more or fewer networks 104. An advantage to interconnecting nodes 102 using multiple networks is that it provides hardware redundancy. This means that, if one network fails for any reason, nodes 102 still can communicate using the remaining one or more functioning networks.

Messages relating to operating in the master-slave configuration are referred to herein as "master-slave messages." In one embodiment, each node 102 sends some or all master-slave messages over multiple networks 104. Networks 104 could be any of various types of networks. For example, some or all networks 104 could be Ethernet links, DSL systems, telephone systems, the Internet, or combinations of these or other types of networks. In one embodiment, some or all of networks 104 are "bus" type networks, where each node connects to a single communication link. In bus type networks, when a node places a message on the network 104, the node 102 essentially "broadcasts" the message to all other nodes on the network 104. In another embodiment, some or all of networks 104 could be point-to-point networks, where message broadcasting is simulated.

Each node 102 includes one or more processors and one or more external network interfaces (e.g., ports). Each network interface allows a node 102 to send and receive messages from an external network 104. For example, a particular network interface could be an Ethernet port, fast Ethernet port, DSL port, or cable modem. In one embodiment, each network interface is a TCP/IP network interface, although other types of interfaces could be used, in other embodiments.

Each node 102 may be capable of running one or more different types of applications. In one embodiment, an application type can be virtually any type of software program that is executed using a master-slave configuration. For example, application types can include routers (e.g., IP and SCSI routers), login tasks, time synchronization tasks, and many other types of applications.

Some types of applications can initiate multiple "instances" of themselves on the same node, where an "application instance" is defined herein as a separately executable instance of a particular application type. An application instance can be, for example, a daemon, task, application program, or other type of software program that is executed by the node. For example, if a node is running an IP router, the node may simultaneously execute multiple instances of the router, where each instance is responsible for routing data between different destinations.

A node 102 that is primarily responsible for (i.e., actually "running") an application instance is considered a "master" for that application instance, and all other nodes 102 are considered "slaves" (or "backups") for that application instance. Any node 102 could be a master for one or more application instances, and/or a slave for one or more other application instances.

During steady state operations, only one master is present in the network for any particular application instance, and only the master actually executes the application instance's central task. The slaves, on the other hand, do not execute the application instance's central task, but are available to perform peripheral tasks and/or to take over the execution in the event that the master fails or resigns, for any reason. This situation is referred to as a "fail over," where one of the slaves becomes the master for a particular application instance.

In one embodiment, during steady state operations, each node is aware of all application instances being executed in the network. Each node executes a task for those of the application instances that the node is a master or a slave. For convenience, this task is referred to as a "main master-slave task" or "main task," although the term "task" is not meant to imply that the various embodiments are limited to use in any particular operating system. For the purposes of brevity and ease of description, the term "application instance" means any node function, operating system function, application or application instance whose communications relating to master-slave operation are being managed by a main task.

For each application instance, the main master-slave task on each node coordinates the transfer of state-related and "Heartbeat" messages between nodes, and also manages state transitions (e.g., master-to-slave, slave-to-candidate, etc.) in accordance with a defined state diagram.

Figure 2:
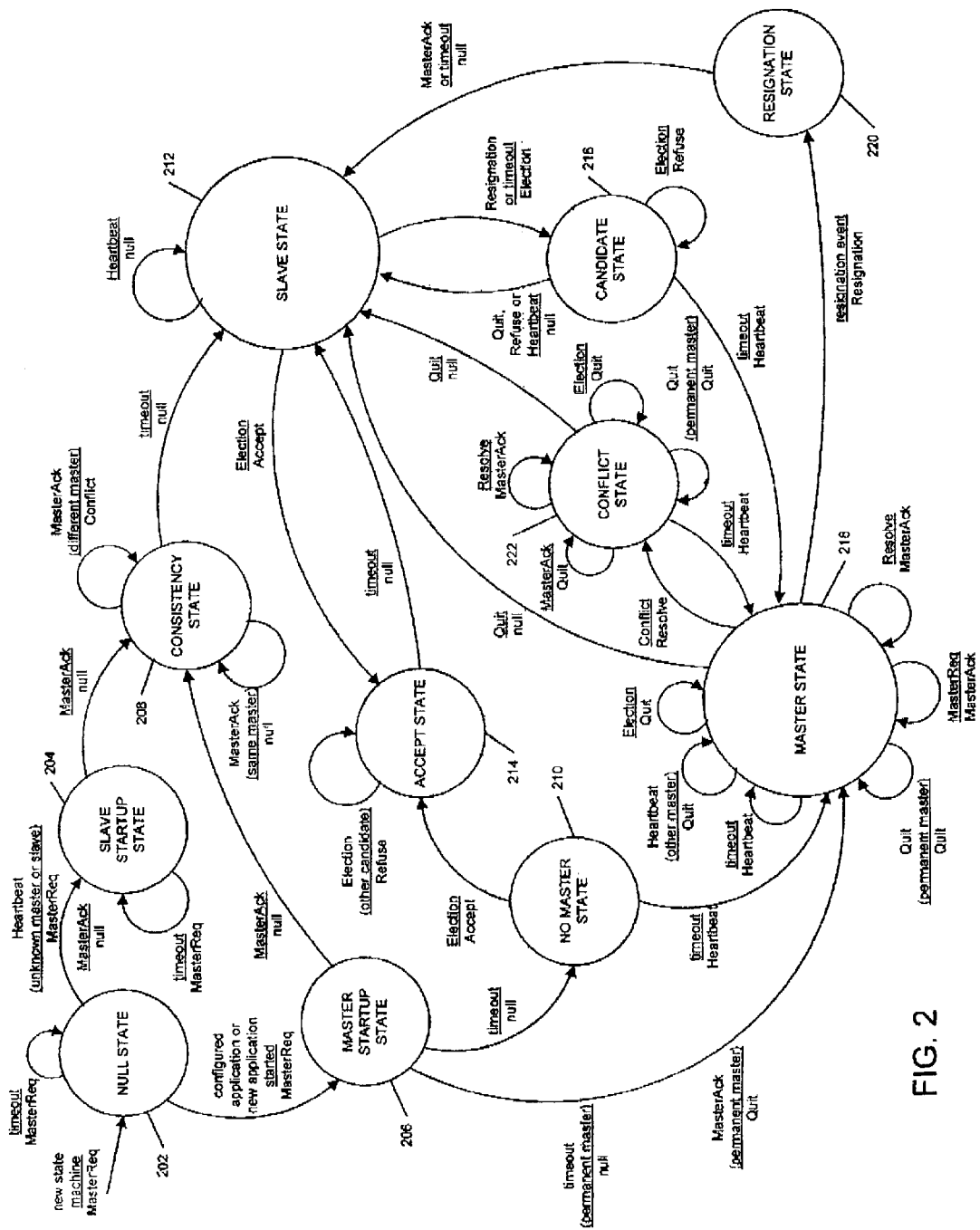
FIG. 2 illustrates a state diagram for a main master-slave task in accordance with one embodiment of the present invention.

FIG. 2 illustrates a state diagram for a main master-slave task in accordance with one embodiment of the present invention. In the figure, circles represent states, and arrows represent transitions. A transition may occur either upon the arrival of a message, the expiration of a timer, or the occurrence of some other event. These transition events are shown on the upper part of the labels superimposed on the arrows. The lower part of each label shows the message that the protocol sends at the time of the corresponding transition. A "null" label signifies that no message is sent or received. An arrow that loops back to the same state from which it originated signifies that no state transition is performed upon the occurrence of a particular event.

As will be evident from the description below, the embodiments of the present invention have several differences from and provide several advantages over the prior art TSP and other HA protocols. For example, the embodiments of the present invention are capable of managing execution of multiple application instances on the network's nodes, rather than simply managing a single time daemon on each node, as is performed by the prior art TSP protocol. In addition, the embodiments of the present invention enable a node to be configured as a permanent master and/or a preferred slave, as will be described in detail below.

These advantages are achieved, in part, by having each node maintain a state machine for each application instance for which the node is in a master state, a slave state, or another state. The state machine is illustrated in FIG. 2, and a description of each state appears below.

Null State (State 202)

The Null State 202 is entered whenever a new state machine is initiated. A first state machine is initiated upon initialization (i.e., boot up) of the node. As will be described in more detail below, additional state machines are initiated for each configured application that is started manually or automatically upon boot up, and for each application instance running on another node that is detected by the node.

When the first state machine is initiated and enters the Null State 202, several things occur. First, a timeout period timer is initialized. Timeout period timers, referred to simply as "state timers," below, are associated with each of the various states, and each timer indicates how long before the node, for each application instance, should perform a particular action or move to another state, absent some other transition or event. In one embodiment, each state can have a different timeout period from the other states, or each state's timeout period can change from one initialization to another. In other embodiments, the timeout period can be pre-defined and/or specified manually by a user at a console, or can be adjusted based on various system parameters.

While in the Null State 202, the node listens for "Heartbeat" messages from other nodes, indicating that the other nodes are masters and/or slaves for various application instances. In one embodiment, each Heartbeat message can include from one to many "heartbeat segments," where each segment is associated with a master or slave application instance being executed from the remote node that sent the message. In other words, each heartbeat segment identifies an application instance being managed by the node. Heartbeat messages are described in more detail, below.

In addition to listening for Heartbeat messages, the node initially sends out a Master Request (MasterReq) message over the network (or networks). The node also sends out a MasterReq message upon each expiration of the timeout period. The MasterReq message is intended to ask other nodes whether they are operating as a master for any application instances.

If an application instance is a "configured application" or a newly started application instance, then the state diagram transitions from the Null State 202 to the Master Startup State 206, which is described in more detail below. In other words, for each configured application and each application instance that is started after boot up (e.g., manually by a user at a console, or automatically in response to some event), a state machine is initiated, and that state machine enters the Master Startup State 206. Configured applications include application instances that are configured as "permanent masters," in one embodiment.

If the application instance is a configured or new application instance, then the node sends out a MasterReq message, and the state machine transitions to the Master Startup State 206, which will be described in more detail below. If the application instance is not a configured or new application instance, and the node receives a Heartbeat message or a Master Acknowledgement (MasterAck) message from another node, then the state machine transitions to the Slave Startup State 204, which will be described in more detail below. If the node does not have an application instance to start, and receives no Heartbeat message or MasterAck message within the timeout period, then the node remains in the Null State 202, reinitializes the timeout period timer, and continues to send out MasterReq messages. Once the node has discovered an application on the network, the node will not send out the MasterReq message anymore, in one embodiment.

In one embodiment, the node always has at least one state machine in the Null State 202, and that state machine is waiting to discover new application instances within the other nodes of the network. This state machine is referred to herein as an "idle state machine," indicating that it is idling until a new application instance is discovered.

The inclusion of the idle state machine in this embodiment provides an advantage over the prior art TSP protocol. The TSP protocol assumes that only one type of application instance exists within the node and within the other networked nodes (i.e., a time synchronization application). Accordingly, the TSP protocol promptly enters either the master state or slave state upon initiation of the application, and only one master or slave state machine is maintained by a node at any one time. The TSP protocol is incapable of managing multiple application instances on the nodes, or listening for new application instances on the network. In contrast, this embodiment of the present invention always has one or more state machines in the Null State 202, and so it can provide a new state machine whenever a new application instance is started in the node or is discovered in another node through the receipt of a MasterAck or Heartbeat message from that other node.

Slave Startup State (State 204)

The Slave Startup State 204 is entered from the Null State 202 when the application instance is not a configured or new application instance, and the node receives a Heartbeat or MasterAck message from another node, indicating that that other node is the master of the application instance. If the node entered the Slave Startup State 204 in response to a Heartbeat message, the node sends out a MasterReq message, in an attempt to contact the master node for the application instance that the Heartbeat was received for.

If the node entered the Slave Startup State 204 in response to a MasterAck message, or if a MasterAck message is received before the expiration of a timeout period, then a transition occurs to the Consistency State 208, which will be described in more detail below. The node will then manage state transitions for that particular application instance, and a new, idle state diagram is initiated (i.e., started up in the Null State 202) to listen for other, new application instances on the network.

If no MasterAck message is received before the expiration of the timeout period, then it is assumed that there is no known master associated with the Heartbeat message, and the node remains in the Slave Startup State 204, periodically sending out MasterReq messages.

The Slave Startup State 204 enables this embodiment of the present invention to listen to the network and acquire every configured application instance that is active on the network. As will be described in more detail below, this enables the node to identify which other nodes can be failover candidates when a master application instance fails in the node, and also enables the node to identify master application instances on other nodes, so that the node can be a failover candidate for those other nodes.

Master Startup State (State 206)

The Master Startup State 206 is entered from the Null State 202 for each configured application that is automatically or manually initiated on the node, including application instances for which the node is a permanent master. In other words, for each configured application and each application instance that is started after boot up (e.g., manually by a user at a console, or automatically in response to some event), a state machine is initiated, and that state machine enters the Master Startup State 206. Once in the Master Startup State 206, the node sends out a MasterReq message, in an attempt to determine whether a master already exists for the configured application instance.

As described previously, a "permanent master" is an application instance that will always attempt to become master, and eliminate any other master, when it is started. The ability to configure a node as a permanent master for an application instance provides advantages over prior art HA systems. In particular, the node that can most optimally run an application instance can be guaranteed to be the master for that application instance, rather than having a master arbitrarily determined through the election process. In addition, a master that has failed over to a slave can re-acquire its status as master, once it is able to do so.

If the node is designated as a permanent master for the application instance, then it will respond to any received MasterAck message with a Quit message, and will transition to the Master State 218. By sending the Quit message, the permanent master attempts to force any other node on the network to quit as the master for the application instance. Thus, by sending out the Quit message, the node eliminates any other non-permanent master on the network. The node determines whether it is a permanent master for the application instance, in one embodiment, by checking a flag or other indicator stored at the node.

If the node is not a permanent master for the application instance, and if a MasterAck message is received before the expiration of the timeout period, then a transition occurs to the Consistency State 208, which will be described in more detail below. The node will then manage state transitions for that particular application instance, and a new, idle state diagram is initiated to listen for other, new application instances on the network.

If no MasterAck message is received before the expiration of the timeout period, then it is assumed that there is no known master associated with the application instance. If the node is a permanent master, then a transition to the Master State 218 occurs. If the node is not a permanent master, then a transition occurs to the No Master State 210, which will be described below.

Consistency State (State 208)

The Consistency State 208 is entered from the Slave Startup State 204 or the Master Startup State 206. Before entering the Consistency State 208, the node should have received a MasterAck message from another node for a particular application instance. While in the Consistency State 208, the node waits for a timeout period to make certain that no other node is acting as a master for that application instance. During the timeout period, if the node receives a MasterAck message from a node identified in the previous MasterAck message, nothing happens. If the node receives a MasterAck message from another node, the node sends a Conflict message to the first identified master node. The Conflict message enables the first identified master node to work with the second identified master node to eliminate the anomalous condition. If no MasterAck message is received from another node during the timeout period, then the node transitions to the Slave State 212.

No Master State (State 210)

The No Master State 210 is entered from the Master Startup State 206, when the node is not a permanent master for the application instance, and after it is determined that no other master exists for the application instance. The No Master State 210 is intended to handle cases where the state diagram will not transition to the Master State 218, but will instead transition to the Accept State 214. The Master State 218 and the Accept State 214 are described in more detail below.

The state diagram will send out an Accept message and transition to the Accept State 214 if, during a timeout period, the node receives an Election message, described below, from another node that is acting as a slave for the particular application instance. If an Election message is not received within the timeout period, then the node sends out a Heartbeat message, and the state diagram transitions to the Master State 218.

Slave State (State 212)

The Slave State 212 is entered from the Consistency State 208 or the Accept State 214, when a known master exists elsewhere on the network. In addition, the Slave State 212 is entered from the Resignation State 220, when the application instance resigns as master. When an application instance is a permanent master, the only way for it to enter the Slave State 212 is through the resignation process, which will be described in more detail below.

The Slave State 212 is a stable state, meaning that if the associated application instance, the node, and the network are in a steady state (e.g., the node continues to receive Heartbeats from the master for the application instance), then the node remains in the Slave State 212 for the duration of application instance.

Normally, a node periodically sends out a Heartbeat message, which indicates that each master and/or slave associated with the node is functioning properly, and the node is able to continue serving as the masters and/or slaves for the application instances. Consequently, each node in the Slave State 212 for an application instance expects to receive a Heartbeat message on a roughly periodic basis, as well, where the Heartbeat message indicates that the master is functioning properly. In one embodiment, the node expects to receive such a Heartbeat message prior to expiration of a slave state timer. Each time the node receives a Heartbeat message indicating that the master is functioning properly, the slave state timer is reset, and the node remains in the Slave State 212 for the application instance.

If the slave state timer expires, and the node has not received a Heartbeat message that indicates proper master functioning, then the node assumes that the master has malfunctioned. At that time, the state diagram transitions to the Candidate State 216, and initiates an election process to try to become the new master for the application instance. The node may also transition to the Candidate State 216 and initiate an election if the node receives a Resignation message from the master, indicating that the master wants to relinquish its status as master. As will be described later in conjunction with the Candidate State 216, if the slave fails to win the election, it returns to the Slave State 212. Otherwise, it enters the Master State 218.

Besides receiving Heartbeat messages, for each application instance in the Slave State 212, the node periodically transmits (e.g., upon expiration of the state timer) a Heartbeat message over one or more of the networks to which the node is attached. In one embodiment, each Heartbeat message includes status information for each slave (and master, as described below) being managed by the node. Accordingly, the Heartbeat message indicates that the node is still capable of being a slave for an application instance.

While in the Slave State 212, the node also could receive an Election message from another slave that is trying to become the master for the particular application instance. If this occurs, the node sends an Accept message, and the state diagram transitions to the Accept State 214, described below.

The timeout period of the Slave State is defined, in one embodiment, as a multiple of the timeout period used to send a Heartbeat message. In doing so, the occasional loss of a Heartbeat message will not cause a Slave State timeout. In other embodiments, the timeout period could be some value other than a multiple of the timeout period used to send a Heartbeat message.

Furthermore, in one embodiment, when the Slave State timer is reset upon the arrival of an appropriate Heartbeat message, a new Slave State timeout period value is selected. In one embodiment, the new Slave State timeout period is selected as a minimum value plus a random (or semi-random) value. For example, the new Slave State timeout period could be selected as a minimum value of one (or multiple) Heartbeat timeout period plus a value within a range of 1-100 Heartbeat timeout periods, although other minimum values and/or ranges could be used as well. In another embodiment, the Slave State timeout period selection process is not random. Desirably, the selection process results in a high probability that the various nodes in the Slave State for the same application instance will not timeout at the same time. Because one slave is likely to timeout before any other slave times out, the use of a variable timeout period is likely to speed up the election process by limiting the number of candidates, preferably to only one.

In one embodiment, a node can be configured as a "preferred slave." This means that, in the event that the master of an application instance fails (i.e., fails to send out Heartbeat messages), then the preferred slave will be the first slave to attempt to take over as master. In one embodiment, a node recognizes that it is a preferred slave for an application instance, and it alone selects a timeout period that is at or below the minimum value of the range of timeout periods. For example, assume that the normal range of timeout periods for all slaves of a particular application instance is between 10 and 30 cycles, where a cycle could be one Heartbeat timeout period (or some other value). Except for the preferred slave, all slaves would randomly select a timeout period within this range. The preferred slave, however, would select a timeout period below the range (e.g., 6 cycles). Because this slave's timeout period is lower than any other slave's timeout period, the preferred slave will be the first slave to initiate an election, and thus will be most likely to become master. As will be described in more detail later, a preferred slave may also become master through the resignation process (i.e., when a master sends a Resignation message to the preferred slave).

The ability to designate a slave as a preferred slave provides advantages over prior art HA systems. In particular, a node is able to fail over to another node that will still provide efficient network functioning. For example, if a routing application fails on a particular node, the application can be failed over to another node that will continue to provide an efficient routing path for network traffic.

Accept State (State 214)

The Accept State 214 is used, in part, to facilitate conduction of an election over the network. The Accept State 214 is entered from the No Master State 210 or from the Slave State 212 when an election is taking place on the network, as indicated by an Election message from a candidate node. During the Accept State 214, the node will not attempt to become a master. In other words, the node "accepts" the fact that another node is attempting to become a master. If, during a timeout period, the node receives an Election message from another candidate, the node sends a Refuse message. After the timeout period expires, a transition to the Slave State 212 occurs.

Candidate State (State 216)

The Candidate State 216 is entered from the Slave State 212 when the node receives a Resignation message from a master, or when a master's Heartbeat has not been received within the slave state timeout period. Either way, the node sends out an Election message, which institutes an election process. During the election process, the node attempts to become the new master of the application instance.

Figure 3:
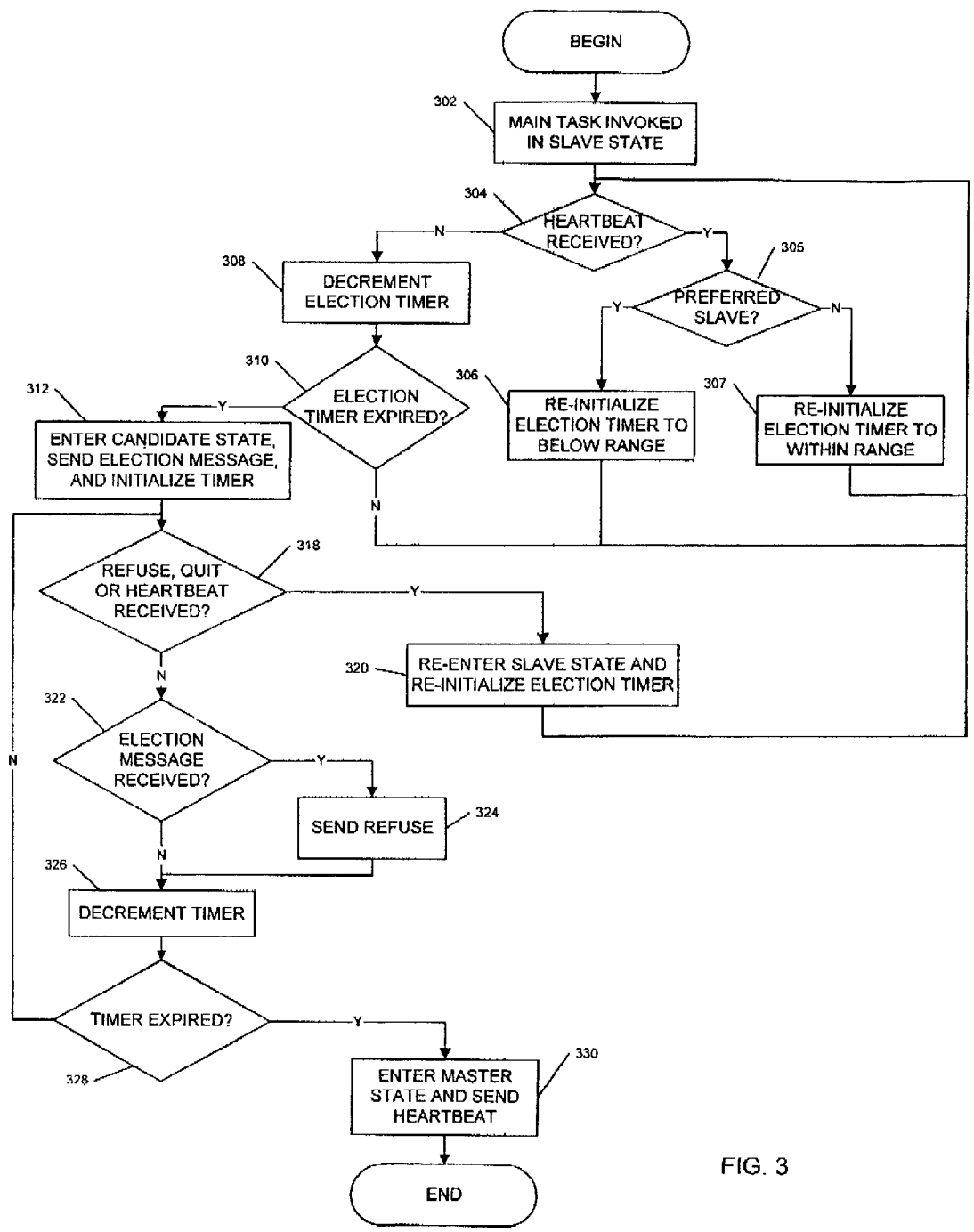
FIG. 3 illustrates a flowchart of a method for a slave to initiate and conduct an election in accordance with one embodiment of the present invention.

FIG. 3 illustrates a flowchart of a method for a slave to initiate and conduct an election in accordance with one embodiment of the present invention. In one embodiment, the method is performed by the main master-slave task. Blocks 302-310 represent processes that occur while the node is in the Slave State (212, FIG. 2), and blocks 312-328 represent processes that occur while the node is in the Candidate State (216, FIG. 2).

The method begins, in block 302, after the main task has been invoked and the node is in the Slave State for an application instance. The main task could be invoked periodically or also upon the receipt of a message. Therefore, a determination is made, in block 304, whether a Heartbeat message has been received from another node that is operating as the master for the application instance.

After a Heartbeat message is received, the node re-initializes it Slave State election timer to a particular timeout value. The election timer indicates when the node should initiate an election to attempt to become the master of an application instance. As described previously, in one embodiment, slaves randomly select Slave State timeout values within a particular range so that all the slaves do not initiate an election at the same time. In other words, the slave with the lowest timeout value is the slave most likely to initiate an election first, and thus become master.

In one embodiment, a slave can be configured as a preferred slave. The preferred slave selects a timeout value, which is lower than the timeout values that other, non-preferred slaves select. This increases the likelihood that the preferred slave will be the first one to detect a master failure and conduct an election. In one embodiment, the timeout value that the preferred slave selects is below the range of timeout values from which the other slaves select their timeout values. This preferred slave timeout value could be the same each time the timer is reset (i.e., it is fixed), or the value could be different each time the timer is reset (i.e., it is variable).

Accordingly, after a Heartbeat message has been received, the main task determines whether or not the node is a preferred slave for the application instance, in block 305. In one embodiment, the node determines whether or not it is a preferred slave by checking a flag or some other indicator, which could have been set manually (e.g., by a user at a console) or in response to a message from another node.

If the node is a preferred slave, then the node re-initializes the Slave State election timer for the application instance, in block 306, to a value that lower than the values that other slaves will select (e.g., a value below the normal range of timeout values). If the node is not a preferred slave, then the node re-initializes the Slave State election timer for the application instance, in block 307, to a value within the normal range of timeout values. After re-initializing the election timer, the procedure iterates as shown.

Referring back to block 304, if a Heartbeat message has not been received, the main task decrements the Slave State election timer, in block 308, and determines, in block 310, whether the election timer has expired. If the election timer has not expired, the method iterates as shown. If the election timer has expired, the node enters the Candidate State (216, FIG. 2), in block 312. When entering the Candidate State, the node broadcasts an Election message, and initializes a Candidate State timer, which indicates how long the node should stay in the Candidate State.

Occasionally, the main task may be invoked before expiration of the Candidate State timer. When invoked, the main task determines, in block 318, whether the node has received a Refuse message, a Quit message, or Heartbeat message from another node that has entered the Master State for the application instance.

If the node has received a Quit or Heartbeat message from another node, it indicates that the other node is already operating as master for that application instance. Similarly, if the node receives a Refuse message from another node, it indicates that another node has previously called an election, and is attempting to become master for the application instance. In these cases, the node re-enters the Slave State, in block 320, re-initializes the election timer, and the method iterates as shown. In one embodiment, the node re-initializes the election timer to a value that depends on whether or not the node is a preferred slave, as described previously.

If a Refuse, Quit or Heartbeat message has not been received, the main task determines, in block 322, whether an Election message has been received from another node during the timeout period. If so, the node sends a Refuse message to the other node, in block 324, causing the other node to return to its Slave State 212 for the application instance.

If an Election message has not been received, and the main task has been invoked at a periodic interval, the main task decrements the Candidate State timer, in block 326. The main task then determines, in block 328, whether the timer has expired. If not, the procedure iterates as shown. If the timer has expired, the node enters the Master State for the application instance, in block 330, sends out a Heartbeat message, and the method ends.

Master State (State 218)

Referring back to FIG. 2, the Master State 218 is entered from the Master Startup State 206 when the node is a permanent master for an application instance, or it is entered from the No Master State 210 or the Candidate State 216. Similar to the Slave State 212, the Master State 218 is a stable state, meaning that if the associated application instance, the node, and the network are in a steady state, then the node remains in the Master State 218 for the life of the application instance.

For each application instance in the Master State 218, the node periodically transmits (e.g., upon expiration of a state timer) a Heartbeat message over one or more of the networks to which the node is attached. In one embodiment, each Heartbeat message includes status information for each master and/or slave being managed by the node. Accordingly, the Heartbeat message indicates that the node is operating properly with respect to each master and/or slave application instance (i.e., the Heartbeat message can have status information for multiple instances). In addition, in one embodiment, the node transmits a Heartbeat message at the time that an application instance is promoted to the Master State 218.

In one embodiment, the nodes alternate to which network the Heartbeat message is sent out on, assuming the node is connected to more than one network. This reduces the amount of traffic going out on a single network. In other words, a single network is not responsible for bearing all of the Heartbeat message traffic. In another embodiment, the node could send the Heartbeat messages out over one particular network without alternating. Alternatively, the node could send them out over more than one network at a time.

The node can transition out of the Master State 218 for several reasons: 1) the node receives a Quit message from another master; 2) the node receives a Conflict message from another node; or 3) a failure of the application instance or the node is imminent or has occurred. Each of these cases is discussed below.

A Quit message indicates that some other node is operating as a master for the application instance. If the node receives a Quit message from another node, the node determines whether or not it is a permanent master (e.g., by checking a flag or other indicator). If the node is a permanent master, it returns a Quit message to the other node, forcing that other node to cease operating as master and become a slave. In order for the network to function properly, only one node should be designated as a permanent master for an application instance. This will avoid the situation where two or more permanent masters volley Quit messages back and forth to each other. If the node is not a permanent master, and it receives a Quit message, a state transition occurs directly to the Slave State 212, and the node then acts as a slave for the application instance.

While in the Master State 218, if the node receives a Conflict message, the node sends out a Resolve message, and a transition to the Conflict State 222 occurs. A Conflict message indicates that one or more other nodes are attempting to act the master for the application instance. The node broadcasts the Resolve message to determine the identity of the other master, so that the node can force the other node into the Slave State. As will be described in conjunction with the Conflict State 222, described below, if the node successfully forces the other master into the Slave State, then a transition back to the Master State 218 occurs. Otherwise, the node becomes a slave for the application instance. If the node is a permanent master, then it will not allow the other node to force it into the Slave State, but will instead force the other node into the Slave State, as will be described later.

The node also may transition out of the Master State 218 if the application instance, application, or node is or soon will be operating improperly. In one embodiment, a monitor task, described later, periodically checks to see how the various application instances in the master state are running. The application instance health is indicated by criteria that the application instance provided upon registering itself. If the application instance is not running properly according to the criteria, or some other resignation event occurs, the monitor task sends a message to the main master-slave task. The main task then causes the node to send out a Resignation message, and a state transition to the Resignation State 220 occurs, as will be described in more detail below. As was described previously, the only way for a permanent master to become a slave is through the resignation process.

The node may respond to several other messages while in the Master State 218. First, if the node receives a Heartbeat message or an Election message from another node that is operating as a master or attempting to become a master of the application instance, the node sends a Quit message to that other node, in an attempt to force the other node into the Slave State. In addition, if the node receives a MasterReq message from another node, the node sends a MasterAck message that identifies the node to the other node. Finally, if the node receives a Resolve message from another node, the node sends a MasterAck message, indicating that the node considers itself to be the master for the application instance.

Resignation State (State 220)

The Resignation State 220 is entered from the Master State 218 when a resignation event occurs, and the node will no longer function as the master for an application instance. In one embodiment, resignation events are detected by the monitor task and reported to the main task. A resignation can also be initiated manually (e.g., by a user at a console).

A resignation event can be a failure of an application instance, an out of tolerance condition, a manual interruption (e.g., by a user at a console), or any other event that indicates the application instance is not or soon will not be operating properly. In one embodiment, the monitor task can be used to initiate a resignation of any or all application instances in the Master State 218 if the health of the node, the operating system, or any particular application deteriorates. For example, the monitor task can periodically check the status of a temperature sensor within the node. If the sensor indicates that the temperature is too high, the task can send a message to the main master-slave task, which then causes all tasks in the Master State 218 to transfer to the Resignation State 220. As another example, the monitor task or another task can periodically call the operating system to check some operating system criteria, such as the system throughput. If the criteria indicate that the operating system is functioning below an acceptable level, the monitor task can send a message to the main task, which can cause some or all application instances in the Master State 218 to transfer to the Resignation State 220, as well.

After a resignation event occurs, the application instance (or instances) enters the Resignation State 220, sends a Resignation message over one or more networks, and initializes a Resignation State timer. The Resignation message informs one or more other nodes in the Slave State for the application instance that an election should be held to elect a new master.

In one embodiment, the Resignation message initially is sent to a single "preferred slave" for the application instance, if one exists. The preferred slave is a node that is first to be given the opportunity to take over as master of an application instance. The identity of the preferred slave could be fixed or dynamic, in various embodiments. For example, the preferred slave could be a slave that is manually pre-designated (e.g., by a user at a console). In another embodiment, the preferred slave could be the slave from which the master last received a Heartbeat message. In still other embodiments, the preferred slave could be identified in a message from another node, or could be selected randomly or based on performance or other criteria.

In one embodiment, if the preferred slave does not conduct an election within a certain period of time, the node sends a Resignation message to another slave. A list of slaves is maintained, in one embodiment, for this purpose. As will be described later, the list could be formed by queuing up the identities of slaves from which the master receives Heartbeat messages. Each time a slave is heard from, its identity would be placed at the top of the list. The master could then sequentially step through the list, from the top down, and continue to send Resignation messages to nodes identified on the list until a slave is able to take over as master. In alternate embodiments, the list of preferred slaves could be pre-designated, or could be formed in some other way. If the node is not able to explicitly resign to any particular slave by sending out Resignation messages, the node can quit sending out Heartbeats, and a "de facto" resignation eventually will occur (i.e., where a slave's election timer expires and it conducts an election).

Referring back to Resignation State 220, if a MasterAck message has not been received, and the main task has been invoked at a periodic interval, the main task decrements the Resignation State timer. The task then determines whether the timer has expired. After expiration of the Resignation State timer, the node will enter the Slave State 212 for the application instance (or instances). If the main task is invoked before expiration of the Resignation State timer, the main task may determine that the node has received a MasterAck message from another node that has entered the Master State for the application instance. If so, the node enters the Slave State 212.

Conflict State (State 222)

The Conflict State 222 is entered from the Master State 218 when a Conflict message is received from another node. As described previously, a Conflict message indicates that the other node detected one or more other masters for the application instance.

Upon receipt of the Conflict message, the node sends out a Resolve message and initializes a Conflict State timer. The Resolve message requests the identity of the other master. Once the identity of the other master is determined, through receipt of a MasterAck message, the node sends out a Quit message to that other master, and eventually returns to the Master State 218. If the node does not receive the identity of the other master within the timeout period, the node returns to the Master State 218, as well. Alternatively, the node may receive a Quit message from the other master. If the node is a permanent master, it responds with a Quit, thus forcing the other master into the Slave State. If the node is not a permanent master, then the node transitions to the Slave State 212 for the application instance.

The node may respond to several other messages while in the Conflict State 222. First, if the node receives an Election message from another node that is operating as a master or attempting to become a master of the application instance, the node sends a Quit message to that other node, in an attempt to force the other node into the Slave State. In addition, if the node receives a Resolve message from another node, the node sends a MasterAck message, indicating that the node considers itself to be the master for the application instance.

Now that a state diagram of a master-slave state machine has been described, various aspects and details of the present invention will be further depicted by FIGS. 4-11 and the associated description, below. First, the way a configured or new application instance is initiated to become a master or slave is described in conjunction with FIG. 4.

Figure 4:
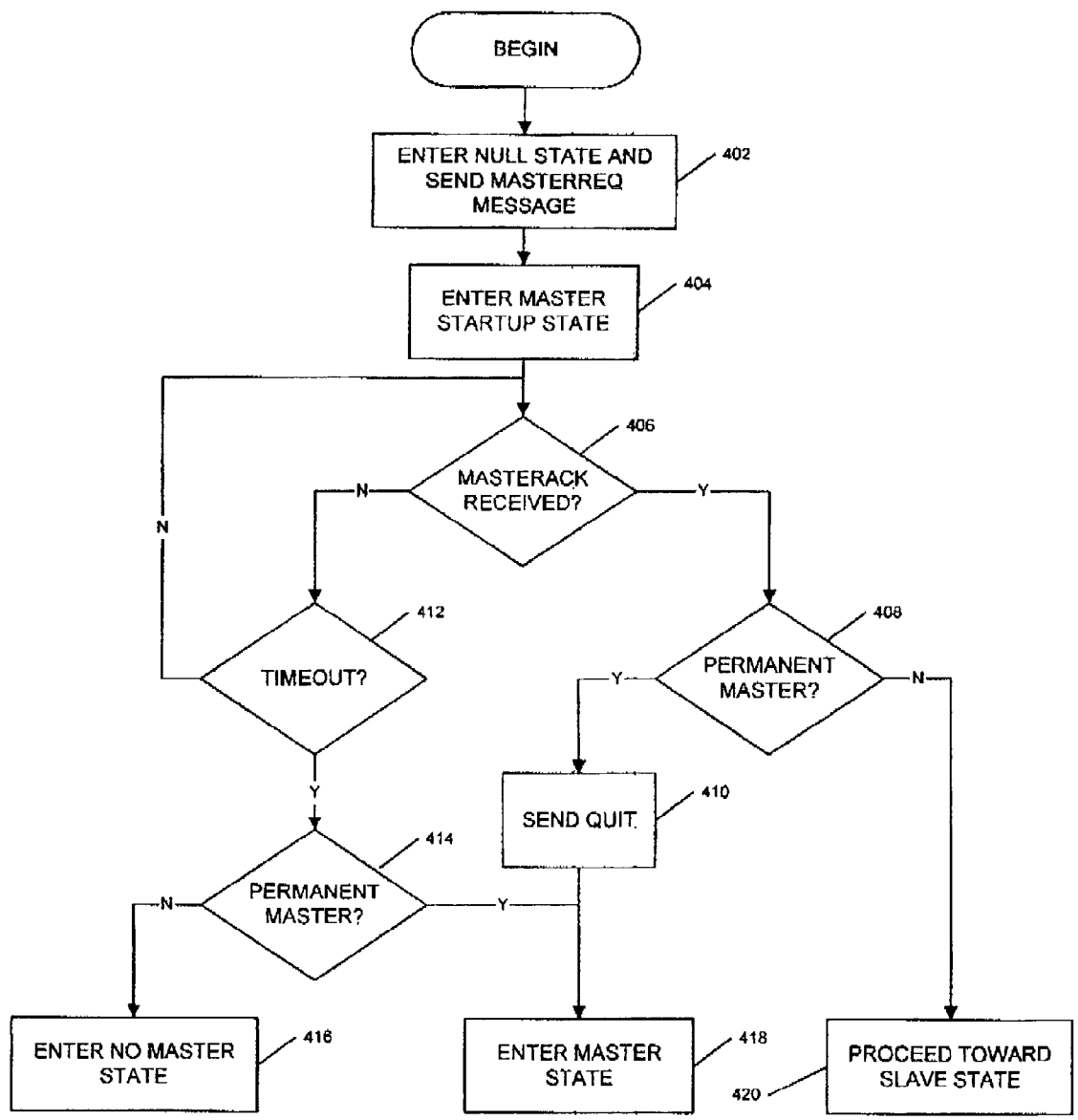
FIG. 4 illustrates a flowchart of a method for starting a configured or new application instance in accordance with one embodiment of the present invention.

FIG. 4 illustrates a flowchart of a method for starting a configured or new application instance in accordance with one embodiment of the present invention. The method begins, in block 402, when an application instance enters the Null State and sends a MasterReq message, as described previously in conjunction with Null State 202 (FIG. 2). Because the application instance is configured, in the current example, the Master Startup State (e.g., state 206, FIG. 2) is then entered, in block 404.

A determination is then made, in block 406, whether a MasterAck message has been received from another node. As described previously, a MasterAck message indicates that some other node considers itself to be the master for the application instance. If no MasterAck has been received, a determination is made whether the state timeout period has expired, in block 412. If not, the procedure iterates until a MasterAck is received or the timeout period expires.

If the timeout period expires, a determination is made, in block 414, whether the node is designated as the permanent master for the application instance. In one embodiment, this determination is made by checking a permanent master flag or other stored indicator. Typically, this indicator would be set manually by a user at a console, for example, although it could be set in response to some condition and/or by a processor. If the node is not the permanent master, then the No Master State (e.g., state 210, FIG. 2) is entered, in block 416. If the node is the permanent master, then the Master State (e.g., state 218, FIG. 2) is entered, in block 418. After entering the No Master or Master states, the state diagram is executed as described previously in conjunction with FIG. 2.

Referring back to block 406, if a MasterAck is received before the timeout period expires, then a determination is made, in block 408, whether the node is designated as the permanent master for the application instance. If not, then the application instance proceeds toward the Slave State (e.g., state 212, FIG. 2), in block 420, as described previously in conjunction with FIG. 2. If the node is the permanent master, then the node sends a Quit message, in block 410, to the node from whom the MasterAck was received. The Quit message will force the other node to relinquish it's master status, so that the permanent master node can take over as master. The permanent master node then enters the Master State (e.g., state 218, FIG. 2), in block 418.

The ability to start an application and force another node to relinquish its master status provides advantages over prior art systems. Basically, it enables an application instance to be started or re-started into the Master State, regardless of whether another node is already functioning as master for the application instance. As described previously, it may be desirable to have a particular node act as master for a particular application instance (e.g., in a routing application). When that node is off-line, another node should take over as master, but when the node is again capable of serving as master, the embodiments of the present invention enable the node to take over as master once again.

Next, the operation of the main master/state task will be described in conjunction with FIGS. 5-7. Briefly, the main master-slave task is initialized upon boot up of the node or later. In one embodiment, the main task is then periodically invoked, and also invoked in response to receipt of a message, as will be described in detail below. The major functions of the main task are:

1) to initiate and maintain state machines for application instances operating in the master-slave configuration across the network (including one additional state machine in the Null State 202, FIG. 2); and
2) to respond to state timer timeouts, messages, and other events.

Initialization of the main task includes the creation of a table, referred to herein as an "application instance state table" or "state table." The application instance state table indicates the current state of each application instance, across the network, which is being operated in the master-slave configuration. Accordingly, in one embodiment, the state table enables the main task to perform the first of its major functions, which is initiating and maintaining state machines for application instances across the network.

FIG. 5 is an example of an application instance state table 500 in accordance with one embodiment of the present invention. For each application instance, the table 500 has a field for the application type 502, application instance identifier (application ID) 504, current state 506, state timer value 508, and monitor result flag 510, in one embodiment. As shown in FIG. 5, the application type 502, application ID 504, state timer value 508, and monitor result flag 510 are designated with integers, and the current state 506 is designated with ASCII values, although they could be designated with other types of characters (e.g., other types of arrays of signed or unsigned characters, or binary or hexadecimal values).

In one embodiment, each application instance is defined by two items of information: the application type 502; and the application ID 504. As its name implies, the application type 502 indicates the type of application (e.g., SCSI router, IP router, or other types) that the application instance corresponds to. In one embodiment, the designators used for the application type 502 are globally known, but they might not be, in another embodiment.

The application ID 504 is an identifier that uniquely identifies each application instance of a particular type to all nodes of the network. For example, the entry 520 having application type "433" has application ID "1037." All nodes of a particular type would be able to uniquely identify the application instance by the application type "433" and application ID "1037." Therefore, the combination of the application type 502 and application ID 504 enables the various nodes to communicate regarding particular application instances. In another embodiment, in which only one application type exists, the application type 502 is not used, and instead the node uses only the application ID 504 to identify the application instance. As indicated by entries 520 and 524, identical application IDs 504 can be assigned if their application types 502 are different. Thus, entries 520 and 524 have identical application IDs of "1037," but different application types of "433" and "763," respectively.

The current state 506 indicates the state, within the state diagram shown in FIG. 2, that each application instance is currently in. The state timer value 508 indicates what the value of the state timer is for the application instance in that particular state. For example, entry 520 indicates that application type "433" and instance "1037" is in the Master State, and that its state timer has a value of "2." In one embodiment, each application instance in the Master State is synchronized to the same value. In the example shown, entries 520, 522, and 526 are in the Master State, and each of these entries currently has a state timer value of "2." In another embodiment, application instances in the Master State do not have synchronized state timer values.

In one embodiment, each Slave State timer also is synchronized with the Master State timers. Accordingly, in the example shown, entry 521, which is in the Slave State, has a state timer value of "2." By synchronizing the master and slave state timers, status information for each managed slave also can be included in the same Heartbeat message as the master status information. In another embodiment, Slave State timers are synchronized with each other, but not with the Master State timers. In this embodiment, a Heartbeat message with the slave status information can be sent out for all of the slaves, and a separate Heartbeat message with the master status information can be sent out for all of the masters. In still other embodiments, either the master or slave state timers could be non-synchronized, and separate Heartbeat messages could be sent out for each application instance, or a multiple instance message could be sent for the masters or slaves that happen to expire at the same time.

When a state timer value 508 has been decremented to "0," some event typically occurs (e.g., the timer is re-initialized, a state transition occurs, and/or a message is sent out). For example, entry 524 is shown in the Resignation State (220, FIG. 2), with a state timer value of "0." Referring also to FIG. 2, this means that the application instance is about to transition to the Slave State (212, FIG. 2).

In one embodiment, each entry in the application instance state table 500 also includes a monitor result flag 510. This flag is used to indicate that a problem has occurred with a master. For example, as will be described in more detail in conjunction with FIG. 11, the flag 510 could be set by the monitor task or other software if a problem has occurred, and the flag could be cleared if no problem has been detected. If the flag indicates that a problem has occurred, then the master task can determine whether a slave is available to take over master operations, as will be described in more detail in conjunction with FIG. 6.

Entries for various application instances are added to the table 500 upon boot up of the node, and also later, as various application instances are started on the node or discovered on the network. Once added to the table, an application instance is referred to herein as a "registered application instance." In order for an application instance being run on the node to register itself, the application instance sends a message to the main task, which includes the application ID for the application. The main task, in turn, creates a table entry in the state table 500 for each of these "configured applications" (i.e., applications that are initialized and registered upon boot up). During operation, the main task can create new table entries, as well, for applications or application instances that are detected in other nodes, or that are started (e.g., automatically or from a console connected to the node) and register themselves after boot up.

As described previously, the node also maintains one entry (e.g., entry 528) in the Null State (202, FIG. 2), which is waiting to detect a new application instance within the node or elsewhere on the network. This entry corresponds to a "null application instance," and not to any particular application type. Accordingly, the application type 502 and application ID 504 fields can be null or blank for this entry. Once a new application instance is discovered, the Null State entry 528 will be assigned an application type 502 and application ID 504, and it will be transitioned out of the Null State to either the Slave Startup State (204, FIG. 2) or the Master Startup State (206, FIG. 2). A new Null State entry is then added to the table. As the above description indicates, state machines for application instances are initiated by adding entries to the state table 500.

Besides being defined by the application type and application ID, each application instance is also defined by a "cluster identifier" (cluster ID), in another embodiment. The cluster ID indicates to which "cluster" of application instances the particular application instance belongs. The concept of clusters enables grouping of application instances and/or application types.

The main master-slave task is executed periodically, and also can be executed upon the occurrence of some event (e.g., a monitor, resignation or message event). Basically, the main master-slave task is responsible for managing state transitions, and for receiving, processing, and sending out Heartbeat and other messages. This is achieved, in one embodiment, using an application instance state table, such as the table 500 described in conjunction with FIG. 5.

Figure 6:
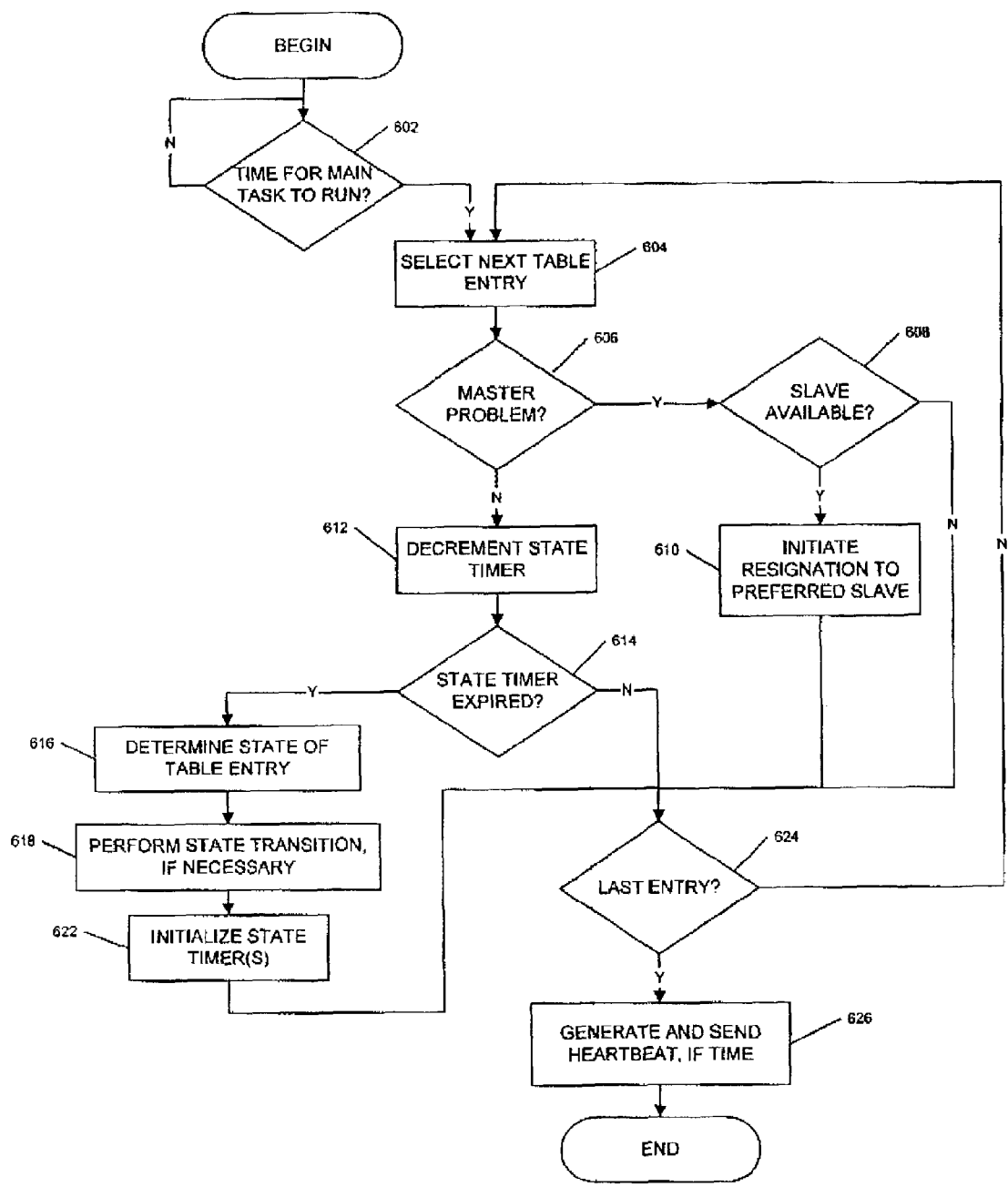
FIG. 6 illustrates a flowchart of a method for a main master-slave task to execute periodically in accordance with one embodiment of the present invention.

FIG. 6 illustrates a flowchart of a method for a main master-slave task to execute periodically in accordance with one embodiment of the present invention. The method begins, in block 602, after it is determined that it is time for the main task to run. In one embodiment, the task is periodically initiated upon expiration of a system timer, referred to herein as a "watchdog timer," which is re-initialized after it expires. The initialization value of the watchdog timer could be any value within a wide range of values. For example, the value could be within a range of 100-500 microseconds, although it could be larger or smaller as well. In one embodiment, the initialization value of the watchdog timer is some fraction of the time that a Heartbeat message will be created and sent out. For example, a Heartbeat message could be sent after 10 expirations of the watchdog timer, although the message could be sent after greater or fewer (e.g., as few as 1) expirations of the watchdog timer, as well.

The main task selects, in block 604, the next entry in the application instance state table (e.g., table 500, FIG. 5). In one embodiment, entries are evaluated in a top-down, sequential order, although the entries could be evaluated in a different order as well. A determination is then made, in block 606, whether the selected entry corresponds to an application instance in the master state and, if so, whether the monitor result flag (e.g., flag 510, FIG. 5) indicates that a problem has occurred with the master. For example, the flag could be set if a problem has occurred, and the flag could be cleared if no problem has been detected.

If the flag indicates that a problem has occurred, then a determination is made, in block 608, whether a slave is available to take over master operations. The node would know whether a slave were available if it had received a Heartbeat message for one or more slaves in the past. If a slave is available, then the node initiates a failover, in block 610, by sending out a Resignation message, described previously in conjunction with FIG. 2 and the Resignation State 220.

In one embodiment, the node resigns to a "preferred slave." The preferred slave is another node to which a master will first attempt to resign. In one embodiment, the node stores the node IDs of each slave from which it receives a Heartbeat message, and the preferred slave is the last slave that the node received a Heartbeat from. In other embodiments, the preferred slave is determined in some other way. For example, the preferred slave could be a pre-designated node (e.g., as manually determined by a user at a console), or it could be designated based on some performance or other criteria. The identity of the preferred slave could be fixed or dynamic. As will be described in more detail later, a list of preferred slaves can be maintained by the node. By using a list, if the node is unable to resign to the first preferred slave, it can attempt to resign to one or more other, desirable slaves.

In an alternate embodiment, rather than resigning to a preferred slave, the node could fail over to any available slave. If no slave is available for the application instance, the node does not initiate a failover. In still another alternate embodiment, resignation to a preferred slave could be performed manually (e.g., by a user at a console) or in response to some message or other event. If the node is not able to explicitly resign to any particular slave, the node can simply quit sending out Heartbeat messages, and a de facto resignation eventually will. After resignation, the method then proceeds to block 624, described later.

If no problem is detected in block 606, then the main master-slave task decrements the state timer (508, FIG. 5) for the next table entry, in block 612. A determination is made, in block 614, whether the state timer has expired (e.g., whether it has been decremented to zero or less). If not, the main task proceeds to block 624, which will be described below. If so, the main task determines the current state (506, FIG. 5) of the application instance corresponding to the entry, in block 616.

Based on the current state, the main task then performs a state transition, if required, in block 618. The particular state transition performed by the main task depends on the state that the application is currently in, as was described in detail in conjunction with FIG. 2. For example, if the application instance is in the No Master State (e.g., state 210, FIG. 2) when the state timer expires, the main task would then promote the application instance to the Master State (e.g., state 218, FIG. 2) by changing the current state field (e.g., field 506, FIG. 5). Upon entry into a state, the main task may generate and send out one or more messages.

The main task then initializes the expired state timer or the state timer of the newly entered state, in block 622. The state timer could be set to some set, pre-defined or semi-random value. For example, the initialization value for the Slave State (e.g., state 212, FIG. 2) timer could be selected from a range of values, as was described previously in conjunction with FIG. 2. In one embodiment, if the slave is a preferred slave, it selects a timer value below the normal range. Alternatively, the initialization value for the Slave Startup State (e.g., state 204, FIG. 2) timer could always be the same pre-defined value, although it is not necessarily so.

In still another embodiment, the state timer could be set to a value that is synchronized with one or more other state timers. For example, in one embodiment, the state timers for every application in the Master State and the Slave State are synchronized to the same value. This results in the state timers for each of the master and slave state timer then expires at the same time (i.e., during the same execution of the main master-slave task). Because a Heartbeat message is sent out for an application instance upon expiration of a master (or slave) state timer, when all master and/or slave state timers expire at the same time, a single Heartbeat message can include status information for all of the master and/or slave application instances.

If the state timer has not expired, as determined in block 614, or after initializing the state timer, in block 622, the main task determines whether the application instance state table entry just evaluated was the last entry of the table, in block 624. If not, the procedure iterates as shown, and the main task evaluates the next entry in the table.

If the last entry has been evaluated, then a Heartbeat message is completed and sent, in block 626, if it is time for such a message to be sent. For any master application instances that had a problem, as detected in block 606, a heartbeat segment would be excluded from the Heartbeat message. Although the Heartbeat message is shown to be completed and sent at the end of the process depicted in FIG. 6, the message could be completed and/or sent at an earlier time, in other embodiments. After block 626, the main task ends. The main task is then later initiated again upon expiration of the watchdog timer.

In addition to executing periodically (e.g., as described in conjunction with FIG. 6), the main task can execute when an event occurs (e.g., a monitor, resignation or message event). A message event can be, for example, a receipt of a message from a remote node that warrants a state transition in the local node. For example, referring also to FIG. 2, when an application instance is in the Master State 218 and receives a Conflict message, the main task would then be called upon to send out a Resolve message and enter the Conflict State 222.

Figure 7:
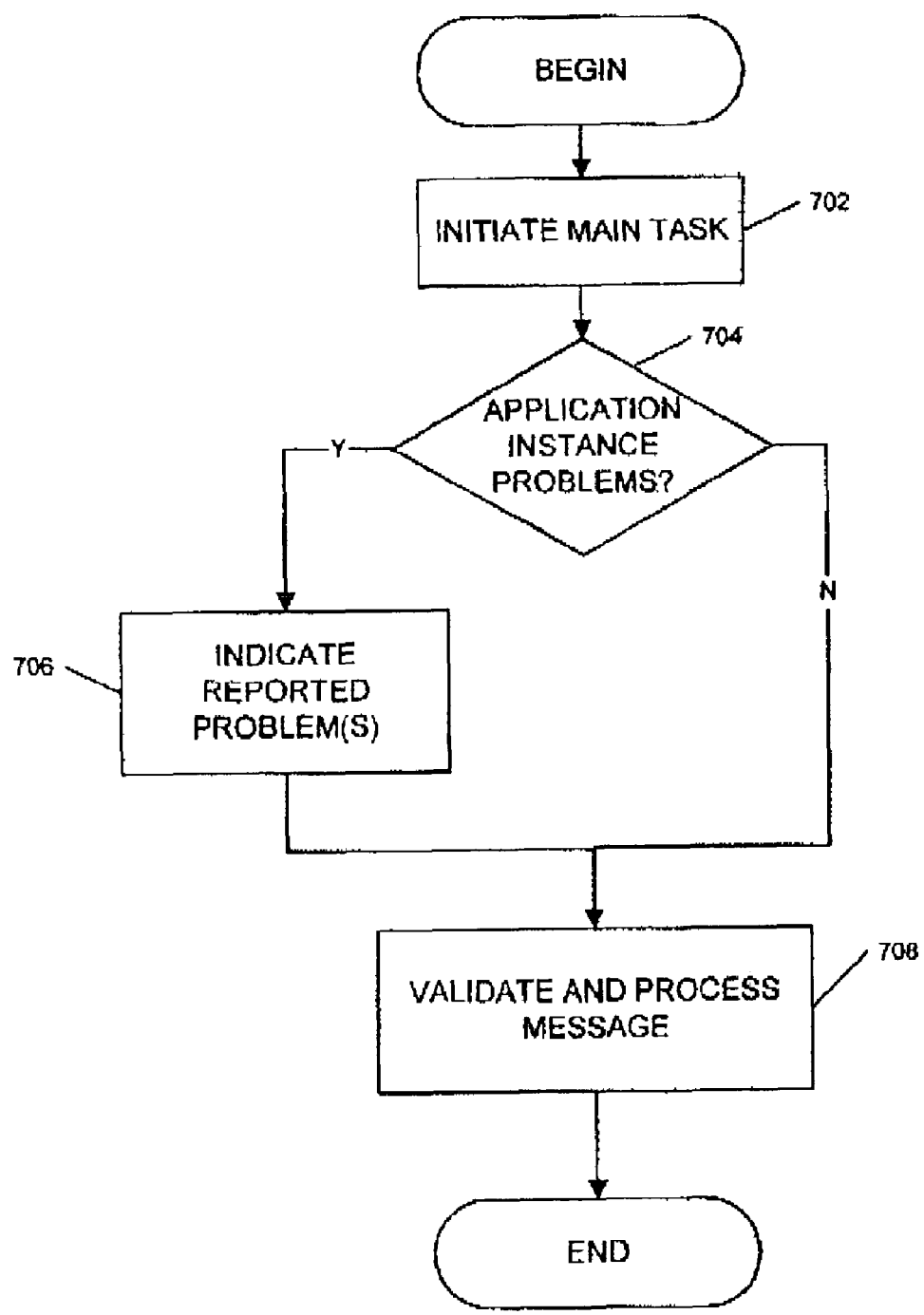
FIG. 7 illustrates a flowchart of a method for a main master-slave task to execute when an event occurs in accordance with one embodiment of the present invention.

FIG. 7 illustrates a flowchart of a method for a main master-slave task to execute when an event occurs in accordance with one embodiment of the present invention. An "event" could be, for example, any periodic or intermittent event that warrants execution of the main master-slave task. For example, an event could be the receipt of a particular message from another node or the receipt of information from a monitor task regarding the operational status of a particular application instance. Typically, the event is something that occurs, which may affect the state diagram of one or more application instances that the main task is executing or monitoring.

The method begins, in block 702, when the main task is initiated after an event occurs. The event could be, for example, receipt of a message from another node that is operating in the master or slave state for an application instance. These types of messages are referred to herein as "network" or "inter-node" messages. Alternatively, an event could be receipt of a second message type from the monitor task running on the node, as will be described in more detail in conjunction with FIG. 10. These second message types are referred to herein as "internal" or "intra-node" messages.

A determination is made, in block 704, whether the event indicates that there is a problem or potential problem with one or more local or remote application instances. This determination could be made, for example, if the main task received an internal message from the monitor task, which indicates an application instance, application or node problem. For example, the monitor task could have determined that a master application instance has failed, or that the node will soon fail. The monitor task would have then sent an internal message to the main master-slave task, reporting the problem. As another example, the node may have received a Heartbeat message from a remote node, indicating that a master application instance at the remote node has failed. Numerous other network messages also could be received (e.g., MasterAck, Election, Quit, Resolve, etc.), which do not necessarily indicate a problem with an application instance.

If a problem exists with one or more application instances, the reported problem or problems are indicated, in block 706. In one embodiment, a problem with a specific application instance is indicated by the main task modifying the monitor result flag (e.g., field 510, FIG. 5), within the application instance state table (500, FIG. 5) for the appropriate application instance. The next time the main master-slave task is called upon, it will then be able to resign to a preferred or other slave, and/or to exclude the application instance from the next generated Heartbeat message.

After indicating the reported problem(s), or if an application instance problem has not been identified in block 704, the main task then validates and processes the internal or external message, in block 708. Processing the message can include, for example, sending a message, performing a state transition, or doing nothing, as required. The particular action (or inaction) performed by the main task depends on the state, as was described in detail in conjunction with FIG. 2. If a state transition was performed, the main task then initializes the corresponding state timer. The method then ends.

For example, if the node received a Heartbeat message from a remote node, the node would validate and process the message, and reset any relevant timers (e.g., Slave State timers). Processing of a Heartbeat message from a remote node is described in detail in conjunction with FIG. 8. As another example, if a local master application instance has failed, which constitutes a resignation event, the main task could send out a Resignation message, and transition from the Master State (218, FIG. 2) to the Resignation State (220, FIG. 2). Numerous other state transitions could occur and messages could be sent, depending on the particular state of an application instance and the type of event that occurred, as indicated and described in detail in conjunction with FIG. 2.

FIG. 7 illustrates that the main task is initiated when a message event occurs. In another embodiment, rather than invoking the main task for a message event, the node could queue up received messages, and the main task could respond to the queued messages the next time the task is periodically invoked (e.g., as described in conjunction with FIG. 6). In still another embodiment, the main task could be run continuously. Accordingly, the main task could alter the various state timers based on a system clock, and the task could respond to messages as they are received.

In one embodiment, as described previously, a node can resign to a preferred slave, in the event that the node no longer wants to function as master. The preferred slave can be a node whose identity is fixed or variable. In one embodiment, the preferred slave is the last slave from whom the node received a Heartbeat message. In another embodiment, a list of preferred slaves is maintained. This enables the node to attempt to resign to a different slave, in the event that the first preferred slave is unable to take over as master. A "preferred slave queue" is maintained, in one embodiment, by storing the node identifiers of the slaves from whom the node receives Heartbeat messages, as will be described in conjunction with FIG. 9. First, the format of a Heartbeat message is described in conjunction with FIG. 8.

Figure 8:
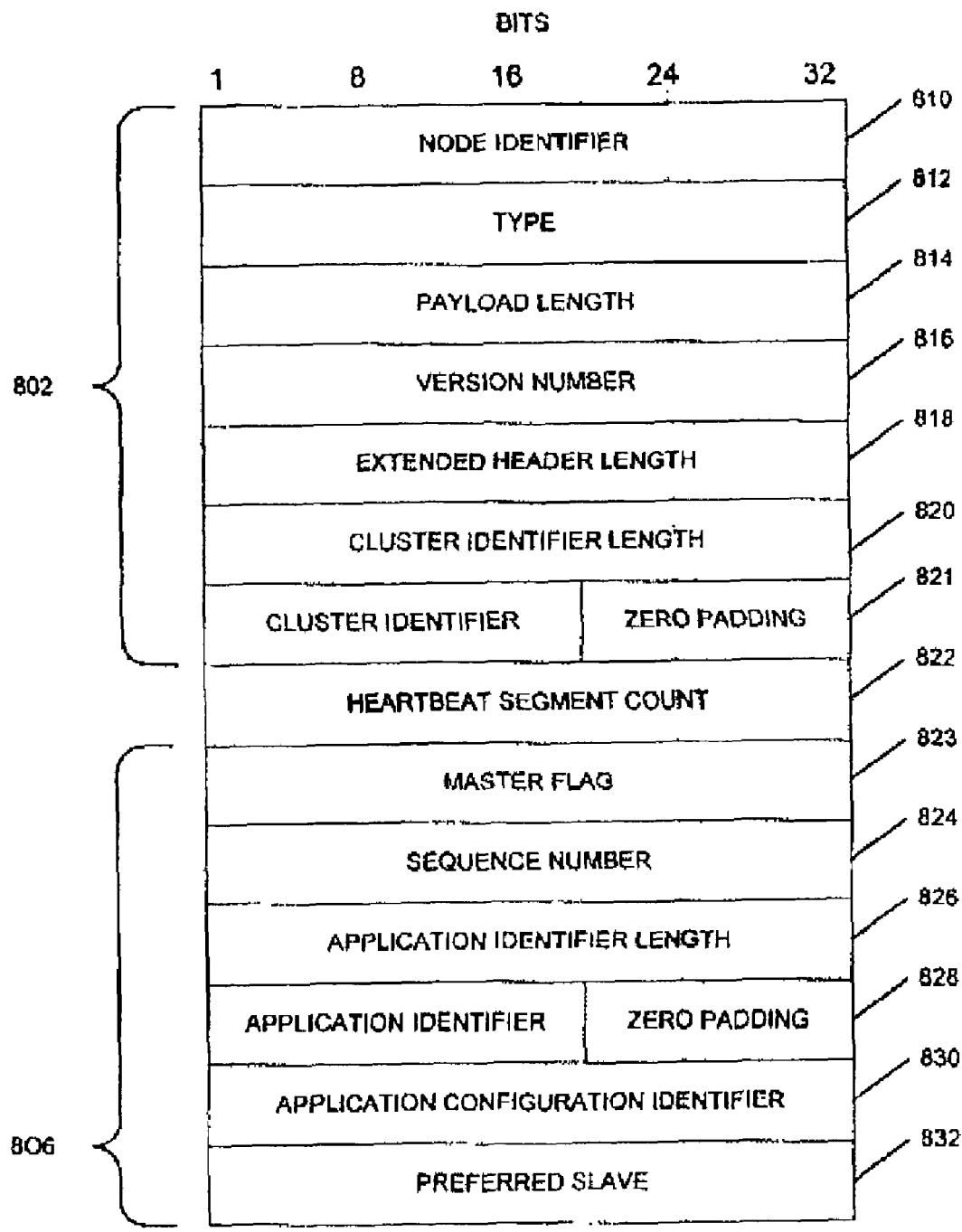
FIG. 8 illustrates a diagram of a Heartbeat message format in accordance with one embodiment of the present invention.

FIG. 8 illustrates a diagram of a Heartbeat message format in accordance with one embodiment of the present invention. In one embodiment, each message field 810-832 is in a long-word aligned, 32-bit format, rather than an 8-bit byte format, as was used for the TSP protocol of the prior art. Accordingly, the message format of this embodiment is better suited for modern computers, which work more efficiently on long-word aligned messages. The format makes message creation and processing easier, and avoids masking and shifts, to a large extent. In other embodiments, the message fields could have more or fewer bits, as is appropriate for the network and computer systems upon which the present invention is implemented.

The Heartbeat message format includes a header 802 and a payload. In one embodiment, the payload consists of one or more heartbeat segments 806. For a single instance Heartbeat message, only a single heartbeat segment 806 exists in the message. For a multiple instance Heartbeat message, anywhere from one to many heartbeat segments 806 are concatenated together within the message. Because the number of heartbeat segments 806 can vary from message to message, a heartbeat segment count field 822 is also present in the Heartbeat message. Basically, the segment count 822 indicates how many heartbeat segments 806 are present in the Heartbeat message. The segment count 822 could be, but is not necessarily, part of the header 802.

The header 802 includes several fields: a node identifier 810; message type 812; payload length 814; version number 816; extended header length 818; cluster identifier length 820; and cluster identifier 821. The node identifier field 810 includes a value, which uniquely identifies the node from which the message was sent.

The message type field 812 includes a value, which indicates what type of to command or response the message is. In the context of the present invention, the message type indicates a Heartbeat message. In one embodiment, no distinction is made whether the message is a single instance or a multiple instance Heartbeat message. In another embodiment, different message types could be used for a single instance and multiple instance Heartbeat message. When the same message format is used for other types of messages, the message type could indicate, for example, that the message is a MasterAck message, an Election message, a Resignation message, or any other type of message that was described in conjunction with FIG. 2. In other embodiments, additional or different messages could be included in the protocol, besides the messages described in conjunction with FIG. 2.

The payload length field 814 includes a value, which indicates the total size of the message's payload. This allows the node to perform buffer size comparisons against the size of the message payload to be processed. In some cases, elements of the payload may be zero-padded. In one embodiment, the length of the zero padding is included in the payload length. In another embodiment, the payload length field 814 could be used as a message length field and could include a value indicating the length of the entire message being processed, rather than just the payload length. As described above, the heartbeat message has a format that allows multiple heartbeat segments to be included within the heartbeat message, and the payload length field 814 enables the number of segments to be determined. In other embodiments, the number of heartbeat segments could be indicated in some other way (e.g., by including an integer value that indicates the number of segments).

The version number field 816 includes a value, which indicates the protocol version number of the message. For example, the initial version of the protocol could have a version number of "1." Future updated versions, which could include changes to message contents or format, would have higher (or different) version numbers. The version number enables the receiving node to know the protocol version on which the node should base its processing of the message.

Similarly, the extended header length field 818 includes a value, which indicates how much longer the header 802 is for the new protocol version, if at all longer. For the initial version, the value would likely be "0." By including the version number field 816 and the extended header length field 818, nodes that cannot process all the elements of the current version of the protocol are still able to process those fields that are known. Accordingly, the header format enables both backward and forward compatibility.

In one embodiment, the header 802 also includes two fields 820, 821, which help to identify a "cluster" of nodes for which the message is pertinent. A cluster is a named, virtual group of nodes, interconnected by one or more networks. The nodes in a cluster send each other Heartbeat messages and act as masters and slaves for each other for various application instances. The concept of clusters enables grouping of application instances and/or application types. In one embodiment, each node is a member of only one cluster. In other embodiments, a node could be a member of more than one cluster.

The cluster for which the message is pertinent is identified in a cluster identifier field 821 of header 802. In one embodiment, the cluster identifier is an array of unsigned characters that is padded out to the nearest long word address. Therefore, the cluster identifier field 821 may contain one or more bits of padding (e.g., zero padding). In order to identify the length of the cluster identifier, the header 802 also includes a cluster identifier length field 820, in one embodiment. The cluster identifier length specifies the true length of the cluster identifier, minus any padding.

As described previously, each message also includes a payload that consists of one or more heartbeat segments 806. In one embodiment, the heartbeat segment 806 includes several fields: a master flag 823; a sequence number 824; application identifier length 826; application identifier 828; an application configuration identifier field 830 and a preferred slave field 832. In other embodiments, these fields could be in different orders, and/or some fields could be excluded, and/or other fields could be included in the message.

The master flag 823 includes a value, which indicates whether the node that created the message (as identified by node ID 810) is the master of the application instance associated with the heartbeat segment. In one embodiment, the flag 823 is set if the node is the master, and is cleared if the node is not the master.

As indicated in the description of FIG. 2, it is not imperative that messages receive responses, in accordance with one embodiment. However, certain message exchanges do hope for a request-response sequence. For example, when a MasterReq message is sent out, it is expected that a MasterAck message may be received in response. Therefore, in one embodiment, a sequence number is included with some or all messages. In one embodiment, no responses are expected for Heartbeat messages. Therefore, a sequence number may or may not be included in the message. Regardless, the sequence number is described in detail below.

The sequence number field 824 includes a sequence number, which is incremented for every request message that a master creates and sends for a particular application instance. In one embodiment, slaves do not maintain a sequence number to identify requests that it sends, because slaves rarely (or never) send such requests. In another embodiment, each slave does maintain a sequence number for requests that it sends. In still another embodiment, sequence numbers are not needed, and therefore are not used by masters or slaves at all.

A response that a slave makes to the master's request message uses the same sequence number that was in the master's request message. Therefore, the sequence number enables the master to associate a slave's response to the associated, previously-sent request.

In one embodiment, each slave keeps track of a master's sequence number for each application instance. This enables a slave to avoid reacting to or responding to previously received messages. In other words, the sequence number enables the slave to identify duplicate messages, such as duplicate messages that a master sends out on multiple networks.

In one embodiment, when a slave is promoted to a master for an application instance, the slave uses an incremented continuation of the sequence number used by the previous master. By using a continuation of the sequence number, other slaves will not reject the new master's messages as having been previously sent or unrecognized.

The application instance for which the message is pertinent is identified in an application identifier field 828. In one embodiment, the application identifier includes the application type and the particular application instance ID to which the message pertains (i.e., the destination application instance). The application identifier is an array of unsigned characters that is padded out to the nearest long word address. Therefore, the application identifier field 828 may contain one or more bits of padding (e.g., zero padding). In order to identify the length of the application identifier, the heartbeat segment 806 also includes an application identifier length field 826, in one embodiment. The application identifier length specifies the true length of the application identifier, minus any padding.

The application configuration identifier field 830, which forms a portion of a heartbeat segment 806, indicates an identifier of the current configuration of the database, if any, that a master is using for a particular application instance. This enables slaves to determine whether the configuration information that they are using is correct or is outdated. In the event that the configuration information that a slave is using is outdated, the slave node can request the correct configuration information from the master or elsewhere.

Finally, the heartbeat segment 806 includes a preferred slave field 832. The preferred slave field 832 includes a value that identifies which of the potential slaves is preferred as the new master, in the event that the current master resigns or is unable to continue serving as the master for an application instance.

Although the description of FIG. 8, above, specifies a number of different message fields 810-832 arranged in a certain order, more, fewer or different message fields could be included in other embodiments, and these message fields could be arranged in different orders than the order shown in FIG. 8.

Figure 9:
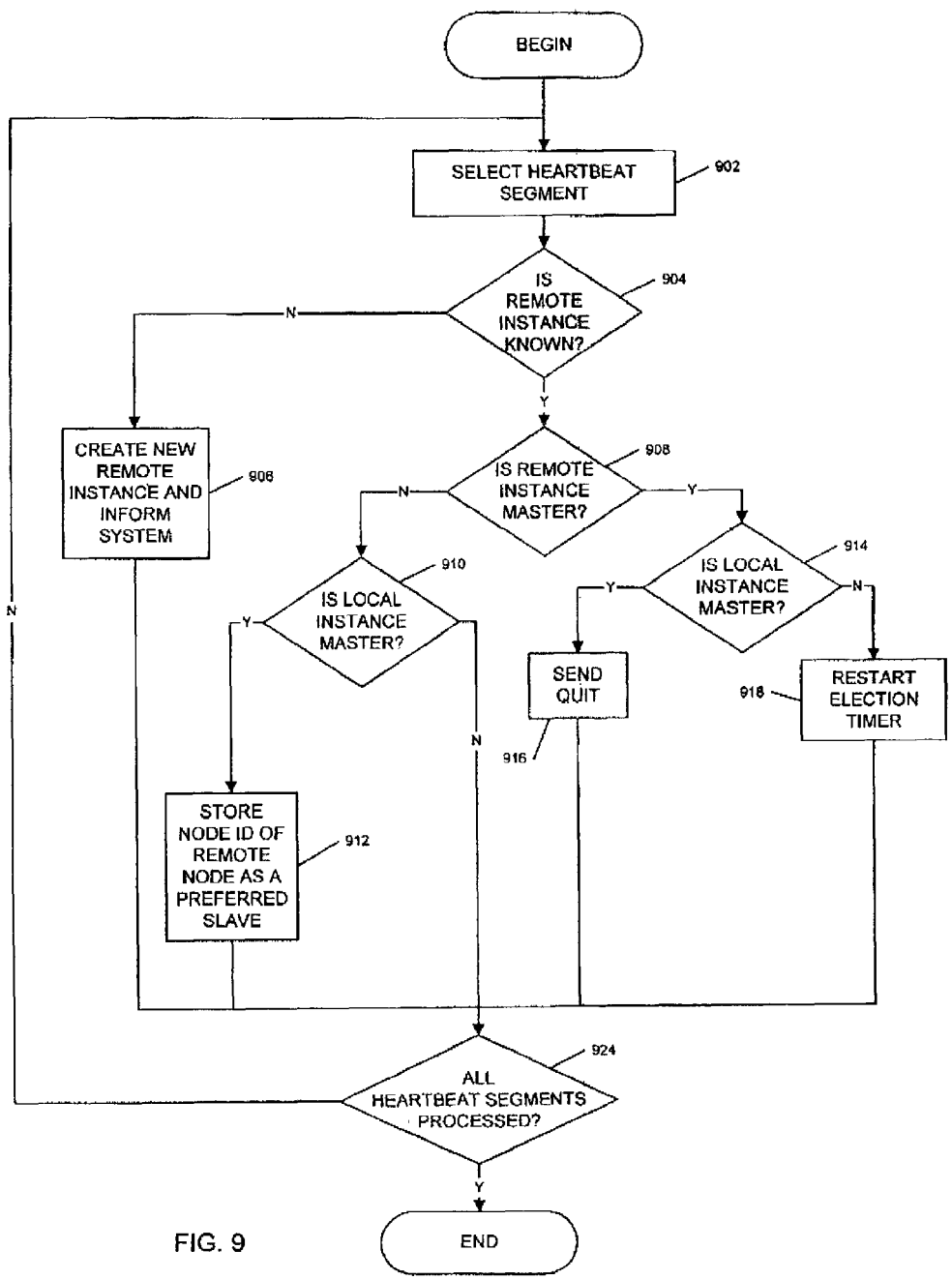
FIG. 9 illustrates a flowchart of a method for a node to receive and process a Heartbeat message in accordance with one embodiment of the present invention.

FIG. 9 illustrates a flowchart of a method for a node to receive and process a Heartbeat message in accordance with one embodiment of the present invention. The method begins after a Heartbeat message has been received from a remote node. After the message has been validated, a heartbeat segment is selected for processing, in block 902. The message is considered valid, for example, if the header information indicates that the message is a Heartbeat message from a remote node.

As described previously, a heartbeat segment (e.g., segment 806, FIG. 8) is a segment of the message that pertains to a particular application instance. In one embodiment, the first heartbeat segment following the message's header is initially selected for processing. During later iterations of the method, if any are necessary, the next sequential heartbeat segment is selected for processing, and so on. In another embodiment, the heartbeat segments could be selected in a different order.

In block 904, a determination is made whether the remote application instance identified in the heartbeat segment (e.g., by the application identifier 828, FIG. 8) is known to the local node. In one embodiment, the remote application instance would be known if an entry with the same application identifier (e.g., field 504, FIG. 5) exists in the application instance state table (e.g., table 500, FIG. 5) stored at the local node.

If the remote application instance is not known, then the local node creates a new remote instance, in block 906. In one embodiment, this is done by adding a new table entry to the application instance state table, where the new entry includes the application identifier (e.g., in field 504, FIG. 5) of the remote instance, and where the state (e.g., field 506, FIG. 5) of the instance is set to "slave." In one embodiment, the state timer value (e.g., field 508, FIG. 5) is synchronized with the other slave state timer values. In another embodiment, the state timer can be initialized to some other value. In one embodiment, the system (e.g., the operating system) is notified that a new application instance exists, which gives the system the opportunity to allocate memory and/or other resources, if necessary.

If, as determined in block 904, the remote instance is known, then a determination is made, in block 908, whether the remote instance is a master. In one embodiment, this determination is made by checking a master flag (e.g., flag 823, FIG. 8) within the heartbeat segment 806. If the flag is set, then the remote instance is presumed to be the master for the application instance, in one embodiment. If the flag is cleared, then the remote instance is presumed not to be the master.

If the remote instance is not master, then a determination is made, in block 910, whether the local instance is master. This determination is made, in one embodiment, by evaluating the entry, which corresponds to the application identifier in the heartbeat segment (e.g., entry 828, FIG. 8), with the corresponding entry in the application instance state table (e.g., table 500, FIG. 5). If the current state field (e.g., field 506, FIG. 5) indicates that the local instance is master, then the node identifier (e.g., node identifier 810, FIG. 8) corresponding to the received Heartbeat message is stored, in block 912, in one embodiment.

In one embodiment, the node identifier is stored in a "preferred slave" queue. The first entry of the queue corresponds to the most recently heard from slave. The second entry of the queue corresponds to the second most recently heard from slave, and so on. By maintaining the preferred slave queue, the node is able to determine which slave was most recently heard from, and resign to that slave. The preferred slave queue can include from one to many entries, depending on how many alternate preferred slaves the node wants to try to resign to, if the first preferred slave is unavailable. In an alternate embodiment, the preferred slave queue could be fixed (i.e., not updated as a result of received Heartbeat messages), or could be updated based on some other messages or criteria. In still another embodiment, the node identifier is not stored. As explained previously, if the node is not able to explicitly resign to any particular slave by sending out Resignation messages; the node can quit sending out Heartbeats, and a de facto resignation eventually will occur.

Referring back to FIG. 9, if the remote instance is master, as determined in block 908, then a determination is made, in block 914, whether the local node also is a master. Again, this determination is made, in one embodiment, by evaluating the entry, which corresponds to the application identifier in the heartbeat segment (e.g., entry 828, FIG. 8), with the corresponding entry in the application instance state table (e.g., table 500, FIG. 5). If the current state field (e.g., field 506, FIG. 5) identifies the local instance as master, this indicates that more than one node is attempting to act as master. Having multiple masters is an undesirable condition, so in accordance with the state diagram illustrated in FIG. 2, when a Heartbeat is received from another master, the local node sends a Quit message, in block 916, to the remote node, and the local node maintains the application in the Master State (e.g., state 218, FIG. 2).

If the local instance is not master, as determined in block 914, it indicates that the local instance is instead a slave. As described previously, when a slave receives a Heartbeat message from the master, the application instance's election timer is restarted, in block 918. As described previously, if the local instance is a preferred slave, the election timer is initiated to a value below the normal range of election timer values, in one embodiment. This increases the likelihood that the preferred slave will initiate an election before any other slaves, thus increasing the likelihood that the preferred slave will become master if the master fails.

After the heartbeat segment has been evaluated, in blocks 902-918, a determination is made, in block 924, whether all heartbeat segments (e.g., all segments 806, FIG. 8) within the received Heartbeat message have been evaluated. In one embodiment, this is done by comparing the number of heartbeat segments evaluated with the heartbeat segment count 822 (FIG. 8) within the Heartbeat message. If all heartbeat segments have not been evaluated, then the next heartbeat segment is selected for evaluation, in block 902, and the method iterates as shown. If all heartbeat segments have been evaluated, then the method ends.

As described previously, in one embodiment, a separate "monitor task," exists to monitor, for correct operation, those application instances that are in the master state on the node. In addition, the monitor task can monitor the operation of the node itself and/or various functions or components associated with the node (e.g., the CPU, memory, operating system, temperature or radiation sensor, power supply, etc.). For ease of description, the term "application instance" is meant to refer to any entity that is being monitored by the monitor task, including but not limited to, applications, application instances, the node, and/or various software or hardware components associated with the node.

Each application instance that wants to be monitored for correct operation "registers" itself by sending a message to the main task. This message identifies the application instance, and also includes the criteria that the monitor task should use to determine whether or not the application instance is operating correctly. The operating system and/or the node itself can also ask the monitor task to monitor particular functions for correct operation, in one embodiment. For example, the node may ask the monitor task to periodically check the value of a sensor that measures the temperature of the node, a component, or the atmosphere. As another example, the operating system may ask the monitor task to periodically check certain performance metrics, such as operating system throughput, for example.

Figure 10:
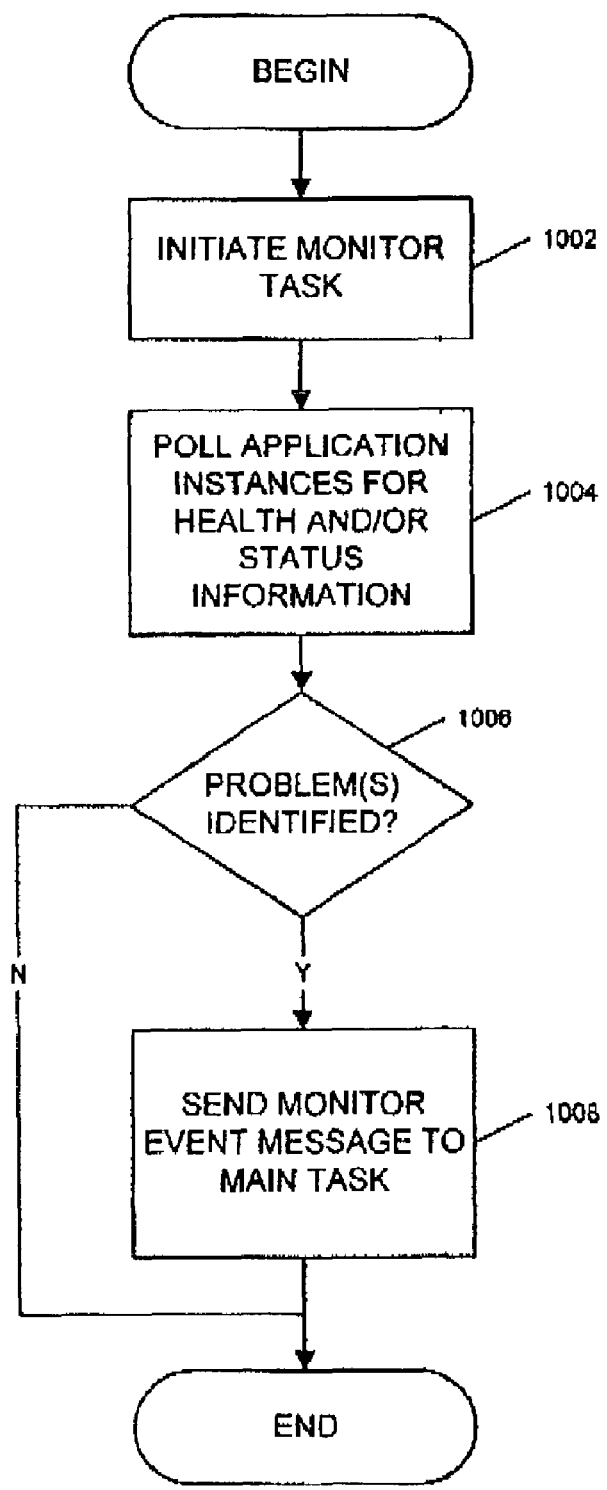
FIG. 10 illustrates a flowchart of a method for a monitor task to execute in accordance with one embodiment of the present invention.

FIG. 10 illustrates a flowchart of a method for a monitor task to execute in accordance with one embodiment of the present invention. In one embodiment, the monitor task is a separate task from the main master-slave task, and both tasks are separately invoked. In another embodiment, some or all of the functionality of the monitor task is incorporated into the main task.

The method begins, in block 1002, after the monitor task has been periodically initiated. In one embodiment, the task is initiated upon expiration of a system timer, which indicates that it is time to run the monitor task. This system timer is re-initialized after it expires. The system timer could be the same watchdog timer as is used by the main task, or it could be a separate timer. In another embodiment, the monitor task is aperiodically invoked, for example, when some interrupt occurs or when a message is received.

In one embodiment, in block 1004, the monitor task polls the application instances identified in the application instance state table (e.g., table 500, FIG. 5), and determines the health and/or operational status of those instances that the monitor task has been asked to monitor. In one embodiment, the monitor task only monitors those application instances that are in the Master or Slave States (e.g., states 218, 212, FIG. 2). In other embodiments, the monitor task can monitor application instances that are in other states as well.

In addition to polling application instances identified in the state table, in one embodiment, the monitor task determines the operational status of any other monitorable functions or components, which might not have been included in the application instance state table. For example, the node could have registered with the monitor task to check the charge of the node's battery. If the battery charge is too low, it could represent an imminent failure of all application instances in the Master State.

In block 1006, the monitor task determines whether a problem has been identified in block 1004 or otherwise, which indicates that the health and/or operational status of one or more application instances are degraded. This determination can be made, for example, if the application instance itself reported a problem, or if the monitor task identified a problem based on information (or a lack thereof) sent to the monitor task from the application instance. Alternatively, the monitor task could obtain information directly (e.g., by making measurements), or could invoke one or more other routines to obtain information indicating the health and/or operational status of the application instances. Basically, the monitor task identifies a problem based on performance criteria for the application instance.

If a problem has been identified with one or more application instances, then in block 1008, the monitor task sends one or more intra-node (i.e., internal) monitor event messages to the main task, which identify the application instance(s) and/or other monitorable functions or components. The message also may give other information, such as an indication of the severity of the operational degradation, or an amount of time before the application instance will not be able to function as a master, for example. The monitor task may then cause one or more application instances to resign as masters, as described previously in conjunction with Resignation State 220, FIG. 2. As described previously, the node may attempt to resign to a preferred slave.

Should an application, application instance, operating system function, or the node function simply fail before the monitor task can alert the main task, or before the main task initiates or completes a resignation procedure, the node will not send out Heartbeat messages that identify the affected application instances, and one or more of the slave nodes will hold an election to attempt to take over the failed application instances. As described previously, a preferred slave may have a timeout value that is lower than the timeout values of other slaves. This increases the likelihood that the preferred slave will conduct an election first, and will become master of the application instance.

If the operation is not degraded, as indicated in block 1006, or after sending a message to the main task, in block 1008, then the method then ends. The monitor task is then later initiated again upon expiration of the timer, or upon the occurrence of some interrupt or message event.

Figure 11:
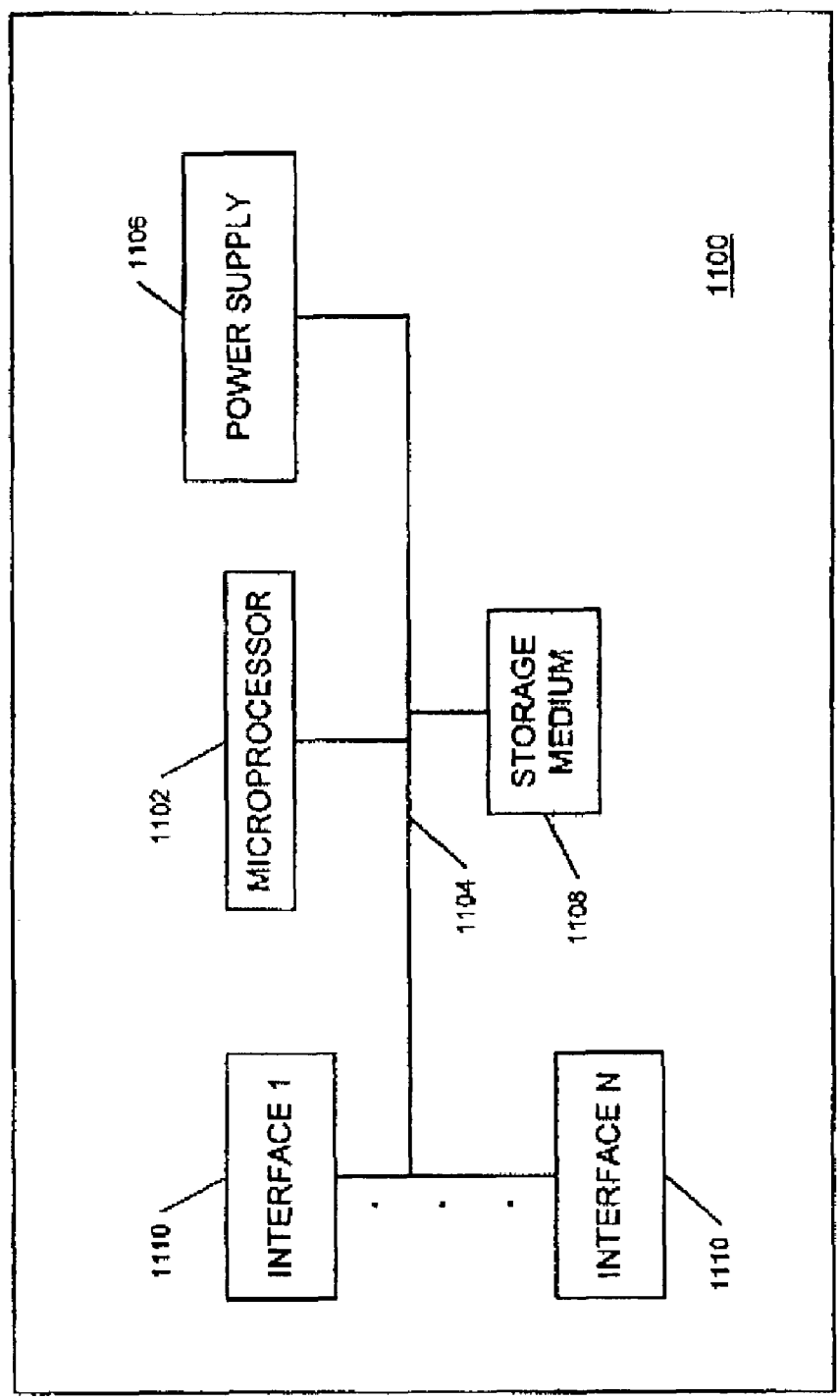
FIG. 11 illustrates a general-purpose computer within which functions of the various embodiments can be practiced in accordance with one embodiment of the present invention.

The functions of the various embodiments can be practiced on a general- or special purpose computer system. FIG. 11 illustrates a general-purpose computer system 1100 (e.g., a node) within which functions of the various embodiments can be practiced in accordance with one embodiment of the present invention. The computer system is housed on one or more PC boards, and includes one or more microprocessors 1102, power supplies 1106, storage media 1108, and from one to N interfaces 1110 to outside networks. In one embodiment, each of these devices is coupled to one or more busses 1104, so that signals and power can be exchanged between devices. In alternative embodiments, each of the devices could be coupled together through different connections.

Interfaces 1110 provide network connections between computer 1100 and one or more networks. Accordingly, interfaces 1110 enable the exchange of messages and information between computer 1100 and other nodes relating to operating one or more application instances in a master-slave configuration. These messages are processed and/or created by one or more microprocessors 1102 or other processing devices, in one embodiment. In addition microprocessor 1102 executes the main master-slave task and the monitor task, at various times, in accordance with the various embodiments of the invention.

Besides executing the various embodiments on a general-purpose computer system, computer executable instructions for performing the methods of the various embodiments can be stored on one or more computer readable media. For example, such computer executable instructions can be stored on RAM, ROM, hard drive, CD, magnetic disk, disk drive, a combination of these types of storage media, and/or other types of storage media that are well known to those of skill in the art.

CONCLUSION

Various embodiments of methods for supporting communications between multiple nodes operating in a master-slave configuration have been described. The various embodiments have numerous advantages over prior art methods and apparatus. For example, the methods of the various embodiments enable multiple application instances within a single node to be managed using a master-slave configuration, rather than managing only a single application instance, as was possible with the prior art. In addition, the various embodiments can continually listen for and begin managing new application instances within the node or in other nodes. The methods and apparatus of the various embodiments also are easily scalable from 2 to N nodes, without changing the design or implementation of the protocol.

Besides these advantages, the methods and apparatus of the present invention enables a node to be designated as a "permanent master" of an application instance, meaning that the node will be able to take over as master from any other node, when necessary. This means that the node that is most desirable as master can operate as the master, whether or not the node is the first node to start the application instance. In addition, a node is able to resign to a preferred slave, in one embodiment. This increases the likelihood that a slave who is available or who is most desirable takes over as master. The methods and apparatus of the present invention provide numerous other advantages over the prior art, as well.

In the foregoing detailed description of the preferred embodiments, reference is made to the accompanying drawings, which form a part hereof, and in which are shown by way of illustration specific preferred embodiments in which the invention may be practiced. These embodiments are described in sufficient detail to enable those skilled in the art to practice the invention. It will be appreciated by those of ordinary skill in the art that any arrangement, which is calculated to achieve the same purpose, may be substituted for the specific embodiments shown.

This application is intended to cover various adaptations or variations of the present invention. The foregoing detailed description is, therefore, not to be taken in a limiting sense, and it will be readily understood by those skilled in the art that various other changes in the details, materials, and arrangements of the parts and steps, which have been described and illustrated in order to explain the nature of this invention, may be made without departing from the scope of the invention as expressed in the adjoining claims. Therefore, all such changes are intended to fall within the scope of the present invention.

What is claimed is:

1. A method for configuring nodes as masters or slaves, wherein the nodes are connected by one or more networks, the method comprising:

initiating, by a first node, a state machine for supporting communications over the one or more networks between the first node and one or more other nodes, wherein the communications relate to executing an application instance in a master-slave configuration, the application instance being one of a plurality of application instances, each application instance having an additional state machine and each of the plurality of application instances managed by the first node through the use of the state machine for supporting communication over one or more networks to manage a state of each additional state machine associated with each of the application instances;

determining whether the first node is a predetermined permanent master of the application instance, wherein the predetermined permanent master is a node which will force any other node that is currently a master of the application instance to quit;

entering a master state for the application instance if the first node is the predetermined permanent master;

determining whether a problem exists with the first node acting as the master for the application instance; and if the problem exists, resigning as the master of the application instance, the resigning comprising sending a Resignation message to a second node that is designated as a preferred slave, wherein the preferred slave is a node that is first to be given an opportunity to take over as the master, and the preferred slave is a node from which the first node most recently received a Heartbeat message.

2. The method as claimed in claim 1, wherein determining whether the first node is the predetermined permanent master comprises checking an indicator stored at the first node.

3. The method as claimed in claim 1, further comprising:

receiving a first message from a second node, which indicates that the second node is the master for the application instance; and sending a second message to the second node, which tells the second node to quit as the master for the application instance.

4. The method as claimed in claim 3, further comprising:

sending a MasterReq message, by the first node, to determine whether any other node is the master for the application instance, and wherein the first message is a MasterAck message, which is received in response to the MasterReq message, and which indicates that the second node is the master for the application instance.

5. The method as claimed in claim 3, wherein the first message is a Heartbeat message, which the second node sent to inform other nodes that it is the master for the application instance.

6. The method as claimed in claim 3, wherein the first message is a Quit message, which the second node sent to attempt to force the first node to quit as the master for the application instance.

7. The method as claimed in claim 1, further comprising:

sending a second Resignation message to a third node, if the preferred slave does not take over as master.

8. The method as claimed in claim 7, further comprising:

the first node maintaining a list of preferred slaves, and wherein the node continues to send Resignation messages to nodes identified on the list until one of the nodes takes over as the master.

9. The method as claimed in claim 1, wherein determining whether the problem exists comprises:

selecting a first entry in a table that includes information relevant to one or more application instances being executed by the first node in the master-slave configuration; and determining whether the problem exists by evaluating performance criteria for the application instance.

10. The method as claimed in claim 1, further comprising:

after entering the master state, occasionally sending a Heartbeat message that identifies the first node and indicates that the first node is in the master state for the application instance.

11. A method for configuring nodes, wherein the nodes are connected by one or more networks, the method comprising:

initiating, by a first node, a state machine for supporting communications over the one or more networks between the first node and one or more other nodes, wherein the communications relate to executing an application instance in a master-slave configuration, the application instance being one of a plurality of application instances, each application instance having an additional state machine and each of the plurality of application instances managed by the first node through the use of the state machine for supporting communication over one or more networks to manage a state of each additional state machine associated with each of the application instances;

entering a slave state as a first preferred slave for the application instance, wherein the first preferred slave is a slave from whom a master most recently received a heartbeat message; and selecting a preferred slave from a queue, the first preferred slave being unable to take over as a master and the preferred slave being a first slave to take over as the master;

receiving a Heartbeat message from a second node that is the master, wherein the Heartbeat message identifies the second node and indicates that the second node is in a master state for the application instance; and resetting an election timer of the preferred slave to a value that is below values that other nodes will set their election timers to upon receipt of the Heartbeat message.

12. The method as claimed in claim 11, wherein the value is fixed.

13. The method as claimed in claim 11, wherein the value is variable.

14. The method as claimed in claim 11, further comprising:

determining whether an election timer has expired without receiving the Heartbeat message;

if the election timer has expired, initiating an election to attempt to become the master of the application instance; and entering the master state for the application instance.

15. A method for configuring nodes as masters or slaves, wherein the nodes are connected by one or more networks, the method comprising:

initiating, by a first node, a state machine for supporting communications over the one or more networks between the first node and one or more other nodes, wherein the communications relate to executing a first application instance in a master-slave configuration, the first application instance being one of a plurality of application instances, each application instance having an additional state machine and each of the plurality of application instances managed by the first node through the use of the state machine for supporting communication over one or more networks to manage a state of each additional state machine associated with each of the application instances;

entering a master state for the first application instance;

determining whether a problem exists with the first node acting as a master for the application instance; and if the problem exists, sending a Resignation message to a second node that is designated as a preferred slave, wherein the preferred slave is a first slave to attempt to take over as a master, and the preferred slave is a node from which the first node most recently received a Heartbeat message.

16. The method as claimed in claim 15, further comprising:
sending a second Resignation message to a third node, if the preferred slave does not take over as the master.

17. The method as claimed in claim 16, further comprising:
the first node maintaining a list of preferred slaves, and wherein the node continues to send Resignation messages to nodes identified on the list until one of the nodes takes over as the master.

18. A method for configuring nodes as masters or slaves, wherein the nodes are connected by one or more networks, the method comprising:

initiating, by a first node, a state machine for supporting communications over the one or more networks between the first node and one or more other nodes, wherein the communications relate to executing an application instance in a master-slave configuration;

determining whether the first node is a predetermined permanent master of the application instance, wherein the predetermined permanent master is a node which will force any other node that is currently a master of the application instance to quit;

entering a master state, to reclaim a position as the master, for the application instance if the first node is the predetermined permanent master;

determining whether a problem exists with the first node acting as the master for the application instance;

if the problem exists, sending a Resignation message to a second node that is designated as a preferred slave, wherein the preferred slave is a node from which the first node most recently received a Heartbeat message and is the node that is first to be given an opportunity to take over as the master;

entering a slave state as the preferred slave for the application instance, wherein the preferred slave is a node that is first to take over as the master for the application instance if the master fails; and setting an election timer to a value that is below values that other nodes will set their election timers to, wherein the election timer is a timer that indicates when the first node should initiate an election to attempt to become the master of the application instance.

19. A first node within a computer system, the first node comprising:

at least one interface to at least one external network, wherein the at least one external network interconnects the node and one or more other nodes;

at least one processor, which initiates a state machine to support communications over the one or more networks between the first node and one or more other nodes, wherein the communications relate to executing an application instance in a master-slave configuration, the application instance being one of a plurality of application instances, each application instance having an additional state machine and each of the plurality of application instances being managed by the first node through the use of the state machine for supporting communication over one or more networks to manage a state of each additional state machine associated with each of the application instances, and determines whether the first node is a predetermined permanent master of the application instance, wherein the predetermined permanent master is a node which will force any other node that is currently a master of the application instance to quit, and enters a master state for the application instance if the first node is the predetermined permanent master;

determining whether a problem exists with the first node acting as the master for the application instance; and if the problem exists, resigning as the master of the application instance, the resigning comprising sending a Resignation message to a second node that is designated as a preferred slave, wherein the preferred slave is a node that is first to be given an opportunity to take over as the master and the preferred slave is a node from which the first node most recently received a Heartbeat message.

20. The first node as claimed in claim 19, wherein the at least one processor also receives a first message from a second node, which indicates that the second node is the master for the application instance, and sends a second message to the second node, which tells the second node to quit as the master for the application instance.

21. A first node within a computer system, the first node comprising:

at least one interface to at least one external network, wherein the at least one external network interconnects the node and one or more other nodes that include a predetermined permanent master; and at least one processor, which initiates a state machine for supporting to support communications over the one or more networks between the first node and one or more other nodes, wherein the communications relate to executing an application instance in a master-slave configuration, and enters a slave state as a preferred slave for the application instance, the application instance having another state machine associated with the application instance, the application instance being one of a plurality of application instances, each application having an additional state machine and each of the plurality of application instances managed by the first node through the use of the state machine for supporting communication over one or more networks to manage a state of each additional state machine associated with each of the application instances, wherein the preferred slave is a node that is first to take over as a master for the application instance if the master fails, and sets an election timer to a value that is below values that other nodes will set their election timers to, wherein the election timer is a timer that indicates when the first node should initiate an election to attempt to become the master of the application instance, wherein the at least one processor also receives a Heartbeat message from a second node that is the master, wherein the Heartbeat message identifies the second node and indicates that the second node is in a master state for the application instance, and resets the election timer to the value upon receipt of the Heartbeat message.

22. A first node within a computer system, the first node comprising:
- at least one interface to at least one external network, wherein the at least one external network interconnects the node and one or more other nodes that include a predetermined permanent master; and
- at least one processor, which initiates a state machine to support communications over the one or more networks between the first node and one or more other nodes, wherein the communications relate to executing a first application instance in a master-slave configuration, the first application instance being one of a plurality of application instances, each application instance having an additional state machine and each of the plurality of application instances managed by the first node through the use of the state machine for supporting communication over one or more networks to manage a state of each additional state machine associated with each of the application instances, and enters a master state for the first application instance, and determines whether a problem exists with the first node acting as a master for the application instance, and if the problem exists, sends a Resignation message to a second node that is designated as a preferred slave, wherein the preferred slave is a node that is first to be given an opportunity to take over as the master, and wherein the preferred slave is a node from which the first node most recently received a Heartbeat message.

23. A computer readable medium having computer executable instructions stored thereon for performing a method for configuring nodes as masters or slaves, wherein the nodes are connected by one or more networks, the method comprising:
- initiating, by a first node, a state machine for supporting communications over the one or more networks between the first node and one or more other nodes, wherein the communications relate to executing an application instance in a master-slave configuration, the application instance being one of a plurality of application instances, each application instance having an additional state machine and each of the plurality of application instances managed by the first node through the use of the state machine for supporting communication over one or more networks to manage a state of each additional state machine associated with each of the application instances;
- determining whether the first node is a predetermined permanent master of the application instance, wherein the predetermined permanent master is a node which will force any other node that is currently a master of the application instance to quit;
- entering a master state for the application instance if the first node is the predetermined permanent master;
- receiving a first message from a second node, which indicates that the second node is the master for the application instance; and
- sending a second message to the second node, which tells the second node to quit as the master for the application instance.

24. A computer readable medium having computer executable instructions stored thereon for performing a method for configuring nodes, wherein the nodes are connected by one or more networks, the method comprising:
- initiating, by a first node, a state machine for supporting communications over the one or more networks between the first node and one or more other nodes that include a predetermined permanent master, wherein the communications relate to executing an application instance in a master-slave configuration, the application instance being one of a plurality of application instances, each application instance having an additional state machine and each of the plurality of application instances managed by the first node through the use of the state machine for supporting communication over one or more networks to manage a state of each additional state machine associated with each of the application instances;
- entering a slave state as a preferred slave for the application instance, wherein the preferred slave is a node that is first to take over as a master for the application instance if the master fails;
- setting an election timer to a value that is below values that other nodes will set their election timers to, wherein the election timer is a timer that indicates when the first node should initiate an election to attempt to become the master of the application instance;
- receiving a Heartbeat message from a second node that is the master, wherein the Heartbeat message identifies the second node and indicates that the second node is in a master state for the application instance; and
- resetting the election timer to the value upon receipt of the Heartbeat message.

25. A computer readable medium having computer executable instructions stored thereon for performing a method for configuring nodes as masters or slaves, wherein the nodes are connected by one or more networks, the method comprising:
- initiating, by a first node, a state machine for supporting communications over the one or more networks between the first node and one or more other nodes that include a predetermined permanent master, wherein the communications relate to executing a first application instance in a master-slave configuration, the first application instance being one of a plurality of application instances, each application instance having an additional state machine and each of the plurality of application instances being managed by the first node through the use of the state machine for supporting communication over one or more networks to manage a state of each additional state machine associated with each of the application instances;
- entering a master state for the first application instance;
- determining whether a problem exists with the first node acting as a master for the application instance; and
- if the problem exists, sending a Resignation message to a second node that is designated as a preferred slave, wherein the preferred slave is a node that is first to be given an opportunity to take over as the master, and wherein the preferred slave is a node from which the first node most recently received a Heartbeat message.

26. A node within a computer system, the node comprising:
- means for interfacing with at least one external network, wherein the at least one external network interconnects the node and one or more other nodes; and
- means for processing, which initiates a state machine for supporting communications over the one or more networks between the first node and one or more other nodes, wherein the communications relate to executing an application instance in a master-slave configuration, the application instance being one of a plurality of application instances, each application instance having an additional state machine and each of the plurality of application instances managed by the first node through the use of the state machine for supporting communication over one or more networks to manage a state of each additional state machine associated with each of the application instances, and determines whether the first node is a predetermined permanent master of the application instance, wherein the predetermined permanent master is a node which will force any other node that is currently a master of the application instance to quit, and enters a master state for the application instance if the first node is the predetermined permanent master, wherein the means for processing also receives a first message from a second node, which indicates that the second node is the master for the application instance, and sends a second message to the second node, which tells the second node to quit as the master for the application instance.

27. A node within a computer system, the node comprising:

means for interfacing with at least one external network, wherein the at least one external network interconnects the node and one or more other nodes; and means for processing, which initiates a state machine for supporting communications over the one or more networks between the first node and one or more other nodes that include a predetermined permanent master, wherein the communications relate to executing an application instance in a master-slave configuration, the application instance being one of a plurality of application instances, each application instance having an additional state machine and each of the plurality of application instances managed by the first node through the use of the state machine for supporting communication over one or more networks to manage a state of each additional state machine associated with each of the application instances, and enters a slave state as a preferred slave for the application instance, wherein the preferred slave is a node that is first to take over as a master for the application instance if the master fails, and sets an election timer to a value that is below values that other nodes will set their election timers to, wherein the election timer is a timer that indicates when the first node should initiate an election to attempt to become the master of the application instance, wherein the means for processing also receives a Heartbeat message from a second node that is the master, wherein the Heartbeat message identifies the second node and indicates that the second node is in a master state for the application instance, and resets the election timer to the value upon receipt of the Heartbeat message.

28. A node within a computer system, the node comprising:

means for interfacing with at least one external network, wherein the at least one external network interconnects the node and one or more other nodes; and means for processing, which initiates a state machine for supporting communications over the one or more networks between the first node and one or more other nodes that include a predetermined permanent master, wherein the communications relate to executing a first application instance in a master-slave configuration, and enters a master state for the first application instance, the first application instance being one of a plurality of application instances, each application instance having an additional state machine and each of the plurality of application instances managed by the first node through the use of the state machine for supporting communication over one or more networks to manage a state of each additional state machine associated with each of the application instances, and determines whether a problem exists with the first node acting as a master for the application instance, and if the problem exists, sends a Resignation message to a second node that is designated as a preferred slave, wherein the preferred slave is a node that is first to be given an opportunity to take over as the master, wherein the preferred slave is a node from which the first node most recently received a Heartbeat message.

\* \* \* \* \*

UNITED STATES PATENT AND TRADEMARK OFFICE
CERTIFICATE OF CORRECTION

| | | |
|---|---|---|
| PATENT NO. | : 7,587,465 B1 | Page 1 of 1 |
| APPLICATION NO. | : 10/131275 | |
| DATED | : September 8, 2009 | |
| INVENTOR(S) | : James D. Muchow | |

It is certified that error appears in the above-identified patent and that said Letters Patent is hereby corrected as shown below:

On the Title Page
On Page 3, under "Other Publications", Item (56), line 6, delete "Clsco" and insert -- Cisco --, therefor.

In column 22, line 11, before "command" delete "to".

In column 32, lines 39–40, in Claim 21, after "machine" delete "for supporting to".

In column 32, lines 45–47, in Claim 21, after "instance" delete "having another state machine associated with the application instance, the application instance".

Signed and Sealed this

Second Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,587,465 B1 Page 1 of 1
APPLICATION NO. : 10/131275
DATED : September 8, 2009
INVENTOR(S) : James D. Muchow It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 962 days.

Signed and Sealed this

Fourteenth Day of December, 2010

David J. Kappos
*Director of the United States Patent and Trademark Office*